United States Patent [19]

Cressey

[11] Patent Number: 4,686,490

[45] Date of Patent: Aug. 11, 1987

[54] DIGITAL DATA MODULATOR AND DIGITAL-TO-ANALOG CONVERTER

[75] Inventor: John R. Cressey, College Park, Md.

[73] Assignee: Hayes Microcomputer Products, Inc., Norcross, Ga.

[21] Appl. No.: 848,988

[22] Filed: Apr. 7, 1986

[51] Int. Cl.$^4$ ............................................. H03C 3/00
[52] U.S. Cl. ......................................... 332/1; 375/62; 455/93
[58] Field of Search .................. 332/1, 16 R; 375/62, 375/67; 455/93; 340/347 DA, 347 M

[56] References Cited

U.S. PATENT DOCUMENTS 4,058,772  11/1977  Mogi et al. ........................ 332/1 X
4,370,747  1/1983  Bugg et al. .............................. 375/62

Primary Examiner—Eugene R. Laroche
Assistant Examiner—Robert J. Pascal
Attorney, Agent, or Firm—Jones & Askew

[57] ABSTRACT

A digital modulator for selectably generating differential phase shift keyed (PSK) data signals and frequency shift keyed (FSK) data signals is disclosed. A clock generator (10) provides carrier frequency clock signals and a plurality of phase-shifted high frequency clock signals. A CLX generator (11) selects the proper PSK or FSK carrier clock. A data scrambler (17) accepts a serial data input stream and provides the scrambled dibit to the dibit encoder (12). The dibit encoder (12) converts the scrambled dibit into two phase-shifting control signals. A three-tap finite impulse response filter (13) generates carrier phase signals by splitting each cycle of the selected carrier clock into eight phases, and, for PSK operation, provides phase shifting in response to the two phase-shifting control signals. A multiplexer (14) selects one of the phase-shifter high frequency clocks in response to the carrier phase signals. A signal selector (15) converts the selected phase-shifted high frequency clock signal into a pulsewidth-modulated clock signal. The signal filter (16) provides the PSK/FSK data signal by integrating the pulse-width-modulated clock signal and also provides band pass filtering to clean up the waveform. The result is a selected PSK/FSK data signal with low distortion, reduced transient DC, and decreased sensitivity to temperature and component selection since bit weighting resistors are not required to generate the output waveform. Also disclosed is a versatile digital-to-analog converter/data modulator for generating FSK and PSK data signals, guard tones, answer tones, dual-tone multiple-frequency dialing signals, and a method for generating frequency-modulated signals.

47 Claims, 7 Drawing Figures

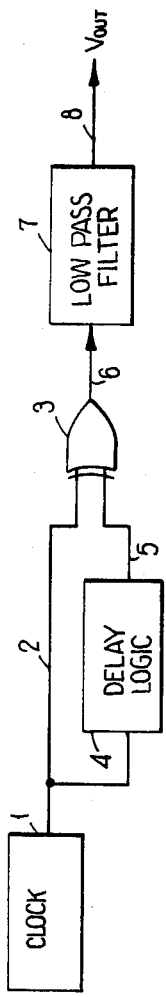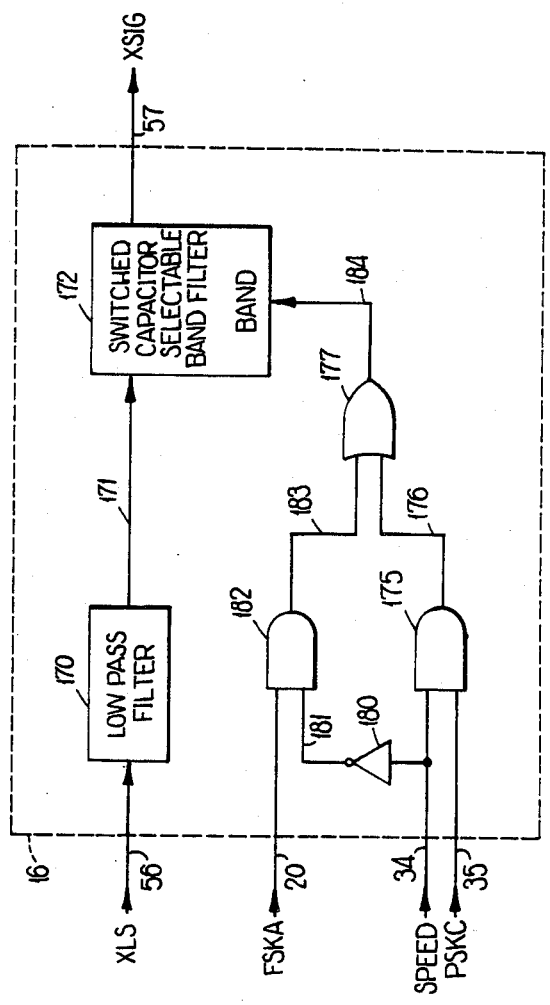

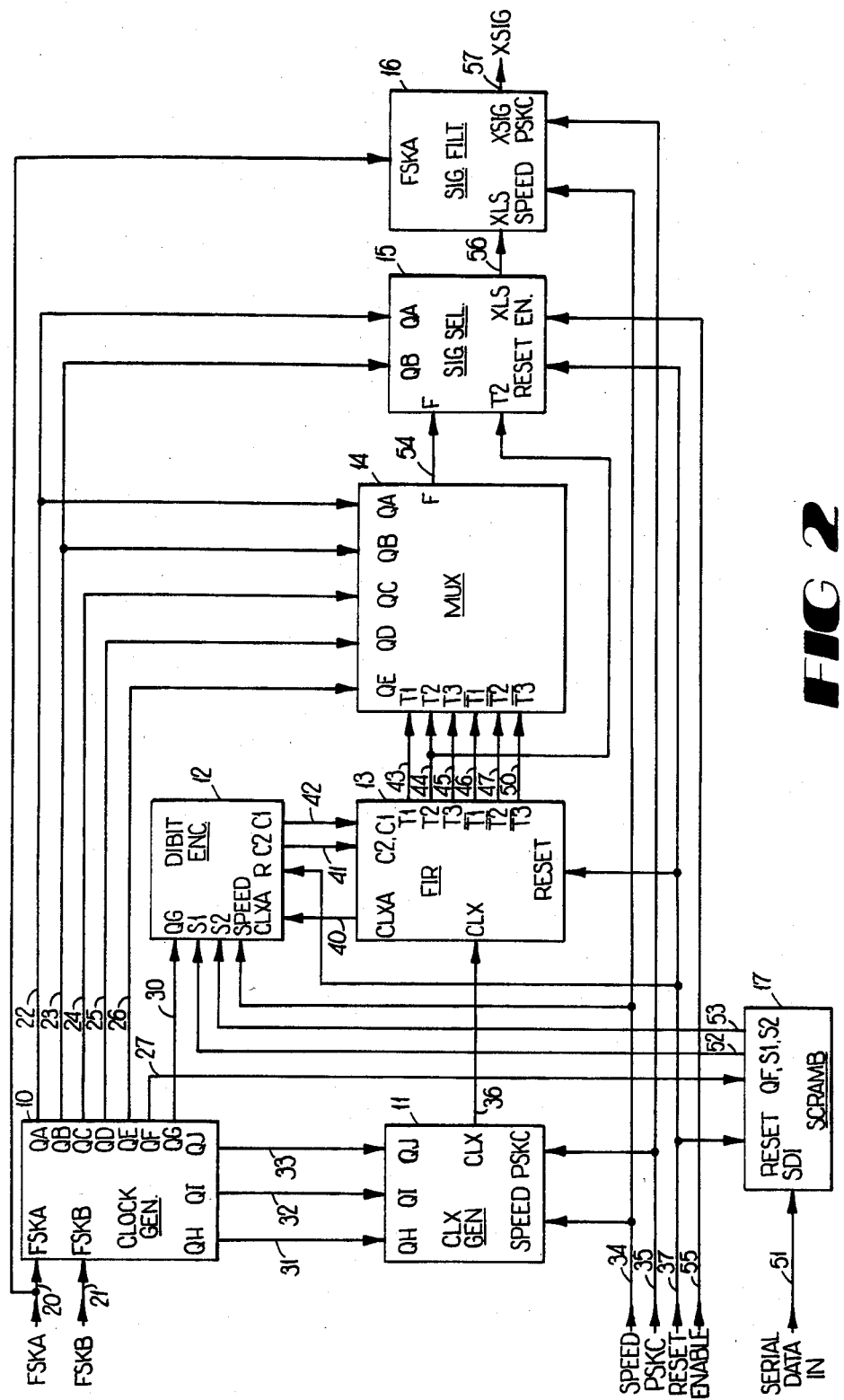

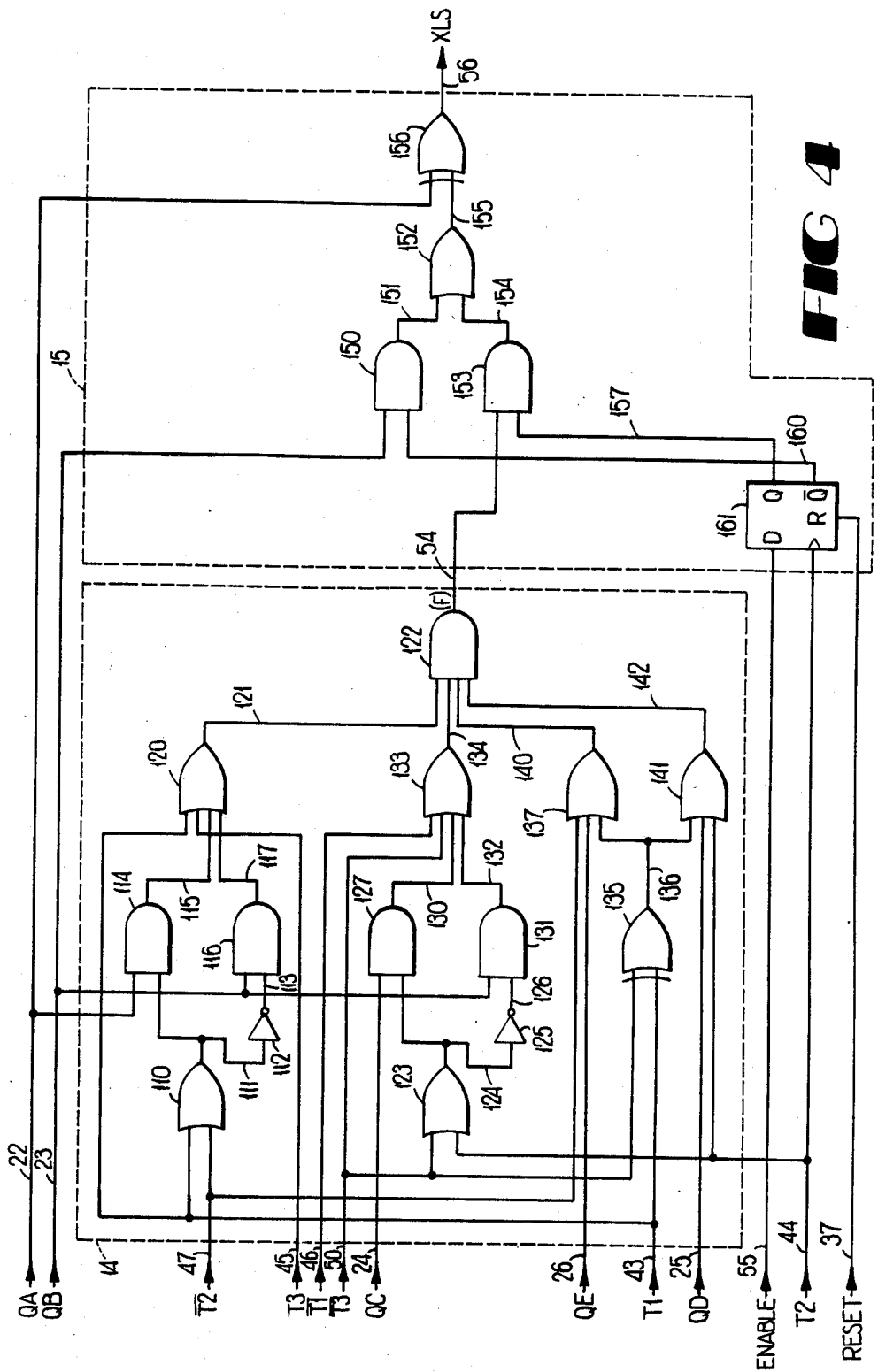

DIGITAL DATA MODULATOR AND DIGITAL-TO-ANALOG CONVERTER

TECHNICAL FIELD

This invention relates to digital data modulators and more particularly to the generation of signal tones, frequency shift keyed tones, and quadrature differential phase shift keyed signals in response to digital data signals. Additionally, the present invention has general utility as a digital-to-analog converter.

BACKGROUND OF THE INVENTION

Digital circuits, because of their better stability, higher speed, lower cost, smaller size, lower power consumption, and reduced sensitivity to the surrounding environment, are now performing many of the functions previously performed by analog circuits. However, many systems, particularly those involving data communications devices linked together by a central office telephone line, require that control and data signals be converted into an analog form for transmission.

Many of these systems use modems (data modulator-demodulator) for the digital-to-analog and analog-to-digital conversion. Several different digital modulation schemes have therefore been developed for use in modems. See, for example, U.S. Pat. No. 4,049,909, issued to Peck on Sept. 20, 1977, and U.S. Pat. No. 4,504,802, issued to Heatherington on Mar. 12, 1985. The Peck U.S. Pat. No. 4,094,909 discloses a quadrature differential phase shift keyed (QDPSK) digital modulator using a frequency divider, a pulse stuffing counter, a three stage shift register, and a weighted combiner comprising three weighting resistors and an analog summer. Although the digital modulator disclosed by Peck is useful it has certain disadvantages and limitations.

First, since an analog summer is used, the output voltage is sensitive to changes in the resistance of the weighting resistors and to changes in the output resistance of the individual stages in the shift register. Of course, precision, temperature stable weighting resistors and matched, temperature stable shift register stages can be used but this increases the cost of manufacture.

Second, the possible output voltages are determined by the weighting resistors and the feedback resistors used in the analog summer. Changing the peak-to-peak output voltage and the individual quantized output voltage steps therefore requires different resistance values to be selectably inserted. This also raises the cost of manufacture since more precision, temperature stable resistors are required and the devices which switch the resistors must also have a stable output resistance.

Third, if two independent signals are to be added, such as the high tone and low tone to form the dual-tone, multiple-frequency singal used for dialing, two sets of resistors and switching devices are required, again increasing the cost of manufacture.

Fourth, under some data input conditions, where the desired differential phase shift is 180° or 270° and the analog output should be its mean value, $0.5 \times (V_{MAX} + V_{MIN})$, the actual analog output will be offset from this mean by as much as $\pm 0.086 \times (V_{MAX} - V_{MIN})$, thereby introducing distortion and transient DC signals into the QDPSK signal.

Fifth, the pulse stuffing counter is not well suited for generating phase shifted signals other than QDPSK signals.

As noted above, many digital modulators are species of digital-to-analog converters. However, most digital-to-analog conversion methods suffer from one or more of the following limitations: the relatively high cost of conventional, N-bit digital-to-analog converters, the need for precision bit-weighting resistors, temperature sensitivity, undesirable power consumption, undesirable size, complex control schemes, limitation to use for a particular type of analog signal, use of more than one of a relatively high cost device, etc.

There is, therefore, a need for a digital modulator, particularly for use in modems, which does not suffer from the above-mentioned limitations.

SUMMARY OF THE INVENTION

The present invention provides such an improved digital modulator which is also usable for a digital-to-analog converter.

Broadly stated, the present invention provides an improved digital modulator especially suited for use in modems. The present invention provides an analog signal by first converting a digital signal into a pulse-width-modulated signal and then converting the pulse-width-modulated signal into an analog signal.

Also, the present invention may be broadly characterized as a digital-to-analog converter which used the average value of a pulsewidth-modulated signal to provide an analog output.

More particularly described, the present invention may be characterized as a digital-to-analog converter wherein a digital input causes two digital clocks having the same frequency, but different phases, to be combined in a digital exclusive-OR operation to produce a pulsewidth modulated signal which is then converted to an analog signal.

Also more particularly described, the present invention may be characterized as a digital modulator which uses a multistage tapped digital filter to selectively combine phase-weighted digital signals to produce a pulse-width-modulated digital signal which is readily converted to an analog signal.

In its preferred form, the present invention splits a cycle of the desired analog output into N phases, generates a pulsewidth-modulated digital signal having a pulsewidth corresponding to the desired analog output for each particular phase, and converts the pulsewidth-modulated signal into the desired analog signal by using a low pass or band pass-filter.

In its preferred form, the present invention also produces dual-tone analog signals by splitting each of the desired frequencies into a predetermined number of phases, selecting a delay-weighted clock for each of the phases for each of the desired frequencies, and digitally combining the selected delay-weighted digital clocks for the desired frequencies by an exclusive-OR operation to produce a pulsewidth-modulated digital signal corresponding to the sum of the amplitudes for the desired analog output of each frequency. The pulsewidth-modulated digital signal is then converted into the desired dual-tone analog signal.

In this preferred embodiment, the present invention is used in conjunction with a data scrambler and a phase encoder which cause selectable 0°, 90°, 180°, and 270° phase shifts to the input of the tapped filter. This arrangement allows the present invention to generate quadrature and binary differential phase shift keyed signals as well as frequency shift keyed signals, dual-tone multiple-frequency signals, particularly those for dialing over central office telephone lines, and other signals commonly used in data communications, such as the answer tone and the guard tone.

Since all signals, except the output of the low pass or band pass filter from which the desired analog output signal is derived, are digital signals, the present invention accomplishes digital-to-analog conversion without the use of conventional digital-to-analog converters and without the need for precision bit-weighting resistors.

In its preferred form, the present invention performs the majority of the signal generation function in a digital format, thus allowing more of the digital-to-analog conversion components to be integrated into a single discrete integrated circuit component.

In its preferred form, the present invention uses a low pass or a band pass filter to perform pulsewidth-to-analog signal conversion, thereby reducing the number of discrete components required. Furthermore, the low pass or band pass filter may be a part of the transmission medium or of the device receiving the puslewidth-modulated signal.

Furthermore, in its preferred form, the present invention provides for selection of the peak-to-peak amplitude of the analog signal by digitally selecting the clock signals with the desired phase delays.

The present invention also provides for generation of frequency-modulated (FM) signals by the same digital-to-analog converter method.

Thus, it is an object of the present invention to provide an improved digital modulator and digital-to-analog converter which used a reduced number of analog components.

It is another object of the present invention to provide an improved digital modulator and digital-to-analog converter which requires no precision bit-weighting resistors.

It is another object of the present invention to provide an improved digital modulator which can selectably generate single frequency signals, dual-tone multiple frequency signals, frequency shift keyed signals, and differential phase shift keyed signals.

It is another object of the present invention to provide an improved digital-to-FM converter.

It is another object of the present invention to provide an improved digital-to-analog converter which reduces the total number of discrete components.

It is a further object of the present invention to provide an improved digital modulator and digital-to-analog converter which provides an analog output with a selectable peak-to-peak voltage.

That the present invention meets these and other objects of the present invention will become apparent from the detailed description below.

BRIEF DESCRIPTION OF THE DRAWINGS

FIG. 1 is a simplified block diagram of an embodiment of the present invention.

FIG. 2 is a block diagram of the preferred embodiment of the present invention for generating frequency shift keyed signals and phase-shift keyed signals.

FIG. 4 is a schematic diagram of the phase-weighted multiplexer and the signal selector of the preferred embodiment.

FIG. 5 is a block diagram of the signal filter of the preferred embodiment.

DETAILED DESCRIPTION

Figure 3:
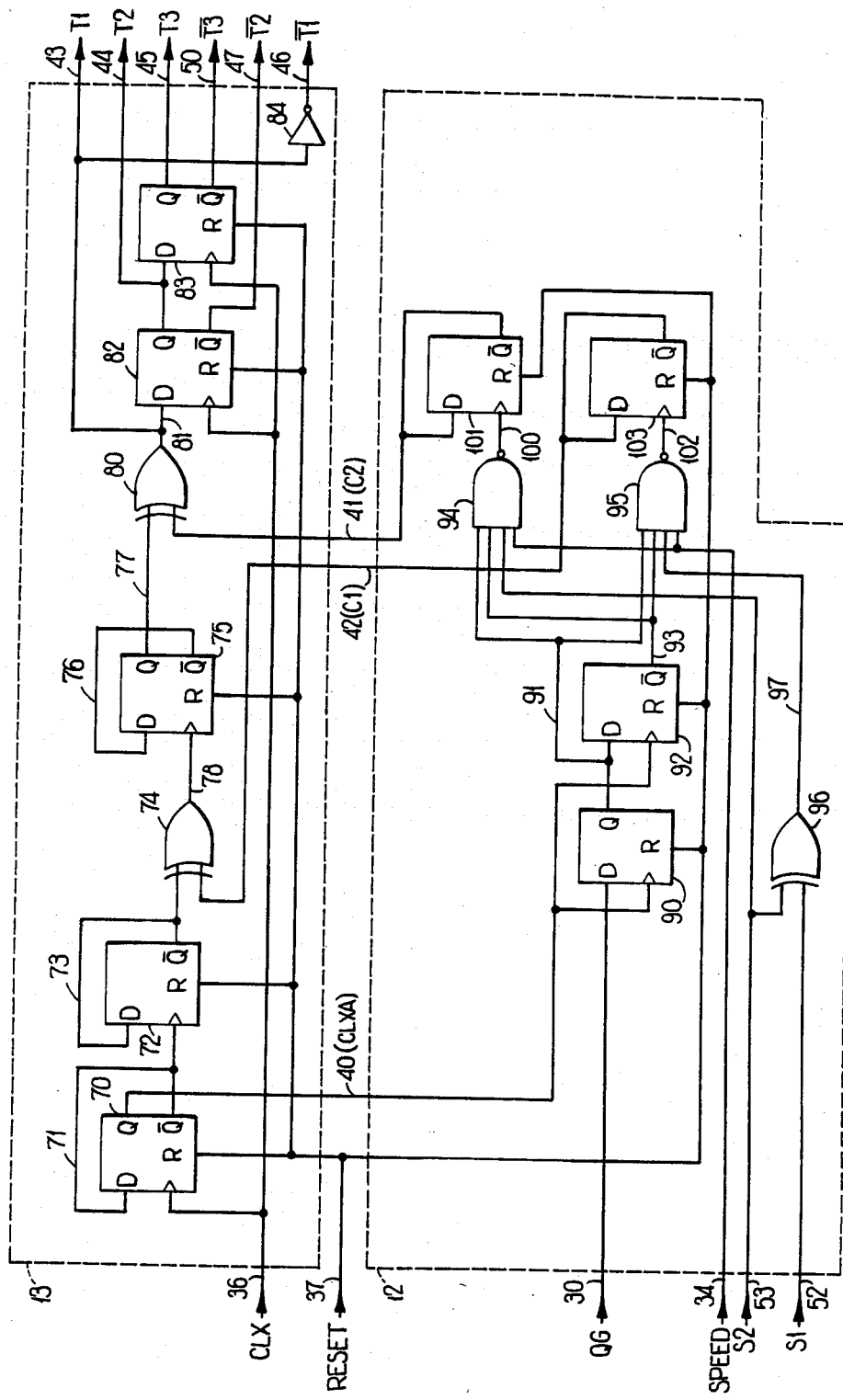
FIG. 3 is a schematic diagram of the dibit phase encoder and the finite impulse response filter of the preferred embodiment.

Turning now to the drawings, in which like numerals represent like components throughout the several figures, the preferred embodiments of the present invention will be described.

FIG. 1 is a block diagram of a simple embodiment of the present invention. The output of clock 1 is, for example, a 78.6 kHz clock, and is connected by conductor 2 to one input of exclusive-OR gate 3 and the input of phase-delay logic 4. It will be appreciated that gate 3 is also known as a modulo-2 adder. The output of phase-delay logic 4 is connected by conductor 5 to the other input of gate 3. The output of gate 3 is connected by conductor 6 to the input of low pass filter 7. Filter 7 places its output on conductor 8.

Assume that delay logic 4 has a delay of zero degrees. The output of gate 3 will be a logic 0 which, for example, is 0 volts. Therefore, the output of filter 7 will be 0 volts.

Now assume that delay logic 4 has a delay of 180 degrees. The output of gate 3 will be a logic 1 which, for example, is $V_A$ volts. Therefore, the output of low pass filter 7 will be $V_A$ volts.

Now assume that delay logic 4 has a delay of 90 degrees. The output of gate 3 will be a 153.6 kHz signal. Note that this 153.6 kHz clock has two components: a 153.6 kHz $V_A$ volt peak-to-peak square wave, and a DC voltage of 0.5 $V_A$ volts. If filter 7 has a cutoff frequency significantly lower than 153.6 kHz, filter 7 will act as an integrator, suppress the 153.6 kHz square wave component and pass the DC component. Therefore, filter 7 will have an average output of 0.5 $V_A$ volts DC. There will, of course, be some 153.6 kHz ripple on the output, the amount being determined by the order and Q of filter 7.

In general, if delay logic 4 has a delay M degrees, the output of gate 3 will be a 153.6 kHz clock with a logic 1 pulsewidth (PW) of:

$$PW = M/(180° \times 153600). \qquad (1)$$

Defining the duty cycle N as the percent of time that the output of gate 3 is a logic 1 yields:

$$N = M/1.8 \qquad (2)$$

A Fourier analysis of the output of gate 3 reveals a low frequency component $C_{LF} = N \times V_A$, plus the fundamental and harmonics of 153.6 kHz. Note that, in this case, $C_{LF}$ is a DC voltage and is passed by filter 7. However, the fundamental and harmonics of 153.6 kHz will be substantially attenuated. The output of filter 7 will therefore be $N \times V_A$ volts.

Assume now that the phase delay M varies in discrete steps as a function of time as shown in Table 1 below. The output of gate 3 will be a 153.6 kHz signal with the discrete, time-dependent duty cycles N shown in Table 1. Also, the normalized low frequency component, $C_{LF}/V_A$, of the output of gate 3 will have the discrete, time-dependent values shown in Table 1.

It will be appreciated that the values 0.0, 0.297, 0.703 and 1.0 of Table 1 are essentially the same as the normalized values 0.0, 0.293, 0.707, and 1.0 disclosed in U.S. Pat. No. 4,049,909, to Peck. The U.S. Pat. No. 4,049,909 is hereby incorporated herein by reference, and teaches that these normalized values can be used in conjunction with an appropriate low pass filter to generate a sinusoidal waveform.

However, the device described in Peck '909 uses a weighted-resistor voltage-summing technique to achieve these values. The present invention avoids the problems and limitations of weighted-resistor voltage-summing techniques by using a digital phase-weighted technique. Furthermore, as is shown below, the digital phase-weighted technique allows for the convenient generation of signals having different normalized values and also allows convenient digital summing of these signals.

TABLE 1

| | DELAY AND DUTY CYCLE | | |
|---|---|---|---|
| time (t) (sec) | Phase Delay (M) | Duty Cycle (N) | $C_{LF}/V_A$ |
| 0 < t < 1/9600 | 0° | 0.0 | 0.0 |
| 1/9600 < t < 2/9600 | 53.4375° | 0.297 | 0.297 |
| 2/9600 < t < 3/9600 | 126.5625° | 0.703 | 0.703 |
| 3/9600 < t < 5/9600 | 180° | 1.000 | 1.000 |
| 5/9600 < t < 6/9600 | 126.5625° | 0.703 | 0.703 |
| 6/9600 < t < 7/9600 | 53.4375° | 0.297 | 0.297 |
| 7/9600 < t < 8/9600 | 0° | 0.0 | 0.0 |

From the above, it will now be appreciated that the desired output on conductor 8 is a function of the duty cycle of the signal on conductor 6 and not a function of the frequency of clock 1. Therefore, the frequency of clock 1 is not critical. However, two times the frequency of clock 1 should be sufficiently greater than the cutoff frequency of filter 7 as to prevent an excessive amount of high frequency (two times clock 1 frequency) ripple on output conductor 8.

The cutoff frequency of filter 7 is not critical but should be between the desired output frequency and the clock frequency. If the cutoff frequency is too low, the desired output waveform will be attenuated. If the cutoff frequency is too high, the output will not be a sinusoidal waveform but will approach a stepped waveform.

Although filter 7 is shown as an integral element in FIG. 1, it will be appreciated that the filtering function may be accomplished by a device external to FIG. 1, such as a line coupling transformer, a data transmission line (e.g.—a telephone line), the connected receiving device, etc. However, the use of such external devices may cause erroneous data reception or interference since the frequency response curve may be unknown, unstable, and/or uncontrollable. Also, the use of such an external device may be prohibited by a government agency (e.g.—the FCC). Therefore, in general, it is preferable to have the filter 7, of known characteristics, as an integral part. It will also be appreciated that the DC component of a typical logic signal has been used to advantage to allow digital-to-analog conversion by pulsewidth modulation and demodulation.

FIG. 2 is a block diagram of the preferred embodiment of the present invention for generating frequency shift keyed signals and phase-shift keyed signals. The preferred enviroment of the present invention is as part of a communications system, such as a modem. The preferred embodiment receives control signals FSKA, FSKB, SPEED, PSKC, RESET and ENABLE, and the serial data input stream from the modem, and provides a selectable FSK/PSK signal, XSIG, to the modem.

Clock generator 10 generatres clock signals QA through QJ. The frequency of clock signal QJ is controlled by input signals FSKA and FSKB, which are connected by conductors 20 and 21, respectively, to control inputs FSKA and FSKB, respectively, of clock generator 10. Clock QJ is used only in the frequency shift keyed (FSK) mode. The frequencies and phases, where relevant, of clocks QA through QJ are given in Table 2. It will be appreciated from Table 2 that clocks QB through QE are delayed versions of clock QA. Clocks QB through QE may be conveniently generated by, for example, shifting clock QA through a multistage shift register at a rate that is a multiple of the frequency of clock QA. Methods of construction of clock generator 10 are well known to those of ordinary skill in the art.

TABLE 2

| CLOCK FREQUENCIES/PHASE | |
|---|---|
| CLOCK NAME | CLOCK FREQUENCY/PHASE |
| QA | 76.8 kHz/0° |
| QB | 76.8 kHz/−90° |
| QC | 76.8 kHz/−180° |
| QD | 76.8 kHz/−53.4375° |
| QE | 76.8 kHz/−126.5625° |
| QF | 1200 Hz |
| QG | 600 Hz |
| QH | 9600 Hz |
| QI | 19200 Hz |
| QJ | 8560 Hz, FSKA = FSKB = 0 |
| | 10160 Hz, FSKA = 0, FSKB = 1 |
| | 16200 Hz, FSKA = 1, FSKB = 0 |
| | 17800 Hz, FSKA = FSKB = 1 |

Note that QH/8 is 1200 Hz, and QI/8 is 2400 Hz, which, it will be appreciated, are the carrier frequencies used by many modems for differential four-phase phase-shift-keying (PSK) communications. Also note that QJ/8 selectably yields 1070 Hz, 1270 Hz, 2025 Hz, or 2225 Hz, which, it will be appreciated, are the frequencies used by various modems for frequency-shift-keying (FSK) communications.

The QH, QI and QJ outputs of clock generator 10 are connected by conductors 31, 32 and 33, respectively, to the QH, QI and QJ clock inputs, respectively, of CLX generator 11. CLX generator 11 routes a selected one of clock inputs QH, QI, and QJ to the CLX output. Control signal SPEED and control signal PSKC are connected by conductors 34 and 35, respectively, to the SPEED and PSKC inputs, respectively, of CLX generator 11. The frequency of the CLX signal on conductor 36 is therefore determined by control signals FSKA, FSKB, SPEED, and PSKC. Table 3 shows the relationship between the frequency of the CLX signal and control signals FSKA, FSKB, SPEED, and PSKC. Methods of construction of CLX generator 11 are well known to one of ordinary skill in the art.

TABLE 3

| CLX FREQUENCIES | | | | | |
|---|---|---|---|---|---|
| SPEED | PSKC | FSKA | FSKB | CLX | CLX/8 |
| 0 | X | 0 | 0 | 8560 Hz (QJ) | 1070 Hz |
| 0 | X | 0 | 1 | 10160 Hz (QJ) | 1270 Hz |

TABLE 3-continued

| | | CLX FREQUENCIES | | | |
|---|---|---|---|---|---|
| SPEED | PSKC | FSKA | FSKB | CLX | CLX/8 |
| 0 | X | 1 | 0 | 16200 Hz (QJ) | 2025 Hz |
| 0 | X | 1 | 1 | 17800 Hz (QJ) | 2225 Hz |
| 1 | 0 | X | X | 9600 Hz (QH) | 1200 Hz |
| 1 | 1 | X | X | 19200 Hz (QI) | 2400 Hz |

X = DON'T CARE

The serial data input stream is connected by conductor 51 to the SDI input of scrambler 17. Clock output QF of clock generator 10 is connected by conductor 27 to clock input QF of scrambler 17. Clock QF clocks the serial data into scrambler 17 at 1200 bits per second. Scrambler 17 performs a standard PSK scrambling algorithm BOUT=BIN XOR BIN-14 XOR BIN-17, where BIN is the input data bit, BOUT is the output data bit, and XOR is the exclusive-OR operation. This scrambler algorithm is used in a number of data communications standards including B212A, CCITT V.22, and others. Scrambler 17 has two outputs, S1 and S2, which represent the scrambled dibit output of the serial data input stream. Methods of construction of scrambler 17 are well known to one of ordinary skill in the art. Control signal RESET is connected by conductor 37 to the reset input of scrambler 17.

The S1 and S2 outputs of scrambler 17 are connected by conductors 52 and 53, respectively, to the S1 and S2 inputs, respectively, of dibit encoder 12. Clock QG of clock generator 10 is connected by conductor 30 to the QG input of dibit encoder 12. It will be appreciated that clock QG has a frequency of 1200 Hz, which is the data rate for 600 baud PSK communications. Control signal SPEED is connected by conductor 34 to the SPEED input of dibit encoder 12. Dibit encoder 12 is disabled when the SPEED input is a logic 0 (FSK mode). The CLXA input of dibit encoder 12 is connected by conductor 40 to the CLXA output of finite impulse response (FIR) filter 13. The CLXA signal has a frequency of one-half of the CLX signal on conductor 36. The C1 and C2 outputs of dibit encoder 12 are connected by conductors 41 and 42, respectively, to the C1 and C2 inputs, respectively, of FIR 13. The C1 and C2 outputs of dibit encoder 12 cause FIR 13 to perform 0°, +90°, +180°, and +270° phase shifts, as explained in more detail below. The preferred embodiment of dibit encoder 12 is described in the discussion of FIG. 3, below.

The CLX output of CLX generator 11 is connected by conductor 36 to the CLX input of finite impulse response (FIR) filter 13. Control signal RESET is connected by conductor 37 to the reset input of FIR 13. The T1, T2, T3, negated T1, negated T2, and negated T3 outputs of FIR 13 are connected by conductors 43, 44, 45, 46, 47 and 50, respectively, to the T1, T2, T3, negated T1, negated T2, and negated T3 inputs, respectively, of multiplexer (MUX) 14. The T2 and T3 outputs are delayed versions, 45° delay and 90° delay, respectively, of the T1 output. The T1 output has a nominal frequency of CLX/8. Changes in state of signals C1 and C2 from dibit encoder 12 cause the T1 output to undergo a selectable 0°, +90°, +180°, or +270° phase shift at the symbol rate. Note that dibit encoder 12 is disabled when control signal SPEED is a logic 0 (FSK mode). Therefore, FIR 13 only causes the above phase shifts to occur when control signal SPEED is a logic 1 (PSK mode). The preferred embodiment of FIR 13 is described in the discussion of FIG. 3, below. Table 4 shows the phase shift of signal T1 in response to changes in the C1 and C2 signals.

TABLE 4

| | T1 PHASE SHIFT | |
|---|---|---|
| C1 | C2 | T1 PHASE SHIFT |
| — | — | 0° |
| — | C | 180° |
| C | — | 90° |
| C | C | 270° |

SPEED = LOGIC 1
"—" = NO CHANGE IN STATE
"C" = CHANGE IN STATE

The QA through QE outputs of clock generator 10 are connected by conductors 22 through 26, respectively, to the QA through QE clock inputs, respectively, of multiplexer (MUX) 14. MUX 14, in response to the asserted and negated T1, T2, and T3 signals causes a selected one of clock signals QA through QE to appear on output F. The F output of MUX 14 is connected by conductor 54 to the F input of signal selector 15. The preferred embodiment of MUX 14 is described in the discussion of FIG. 4, below.

The QA and QB outputs of clock generator 10 are also connected by conductors 22 and 23, respectively, to the QA and QB clock inputs, respectively, of signal selector 15. The T2 output of FIR 13 is also connected by conductor 44 to the T2 input of signal selector 15. Control signal RESET is also connected by conductor 37 to the reset input of signal selector 15. Control signal ENABLE is connected by conductor 55 to the enable (EN) input of signal selector 15.

When control signal ENABLE on line 55 is a logic 0 the XLS output of signal selector 15 is a 153.6 kHz square wave (50% duty cycle). When control signal ENABLE is a logic 1 the XLS output on line 56 is a 153.6 kHz waveform having a duty cycle which varies in response to the F input signal. The duty cycle has five possible values, corresponding to five analog outputs, as listed in Table 5. The XLS output of signal selector 15 is therefore a pulsewidth modulated 153.6 kHz signal. The XLS output of signal selector 15 is connected by conductor 56 to the XLS input of signal processor 16. A change in the ENABLE signal is recognized by signal selector 15 only on the rising edge of signal T2 on line 44. A rising edge on signal T2 indicates that the duty cycle of signal XLS is about to pass through or attain the 50% value. Therefore, recognizing a change in the ENABLE signal (line 55) only on the rising edge of signal T2 minimizes DC transients in the XSIG signal on conductor 57.

TABLE 5

| DUTY CYCLE OF XLS SIGNAL V. CORRESPONDING ANALOG SIGNAL | |
|---|---|
| DUTY CYCLE | CORRESPONDING ANALOG SIGNAL |
| 0.0% | 0.000 (QA XOR QA) |
| 29.7% | 0.297 (QA XOR QD) |
| 50% | 0.500 (QA XOR QB) |
| 70.3% | 0.703 (QA XOR QE) |
| 100% | 1.000 (QA XOR QC) |

Control signal FSKA is also connected by conductor 20 to the FSKA input of signal filter 16. Control signals SPEED and PSKC are also connected by conductors 24 and 35, respectively, to the SPEED and PSKC inputs of signal filter 16. The XSIG output of signal filter 16 on conductor 59 is the selected FSK/PSK signal.

Signal filter 16 performs pulsewidth-modulation-to-analog-signal conversion and band pass filtering of the analog signal to remove undesired frequencies. Signal filter 16 is described in the discussion of FIG. 5, below.

FIG. 3 is a schematic diagram of finite impulse response (FIR) filter 13 and dibit encoder 12. The CLX signal is connected by conductor 36 to the clock input of flip-flops 70, 82 and 83. Flip-flop 70 is configured to perform a divide-by-two function. Flip-flops 82 and 83 are configured to perform as shift registers. The negated Q output of flip-flop 70 is connected by conductor 71 to the data (D) input of flip-flop 70 and the clock input of flip-flop 72. The Q output of flip-flop 70 is connected by conductor 40 to dibit encoder 12. Since flip-flop 70 is configured to perform a divide-by-two function, the frequency of its Q and negated Q outputs will be CLX/2, and its Q output provides the CLXA signal for dibit encoder 12.

Flip-flop 72 is also configured to perform a divide-by-two function. The negated Q output of flip-flop 72 is connected by conductor 73 to its D input and one input of exclusive-OR gate 74. The other input of gate 74 is connected by conductor 42 to the C1 output of dibit encoder 12. The output of gate 74 is connected by conductor 78 to the clock input of flip-flop 75. Flip-flop 75 is also configured to perform a divide-by-two function: its negated Q output is connected by conductor 76 to its D input.

The Q output of flip-flop 77 is connected by conductor 77 to one input of exclusive-OR gate 80. The other input of gate 80 is connected by conductor 41 to the C2 output of dibit encoder 12. The output of gate 80 is connected by conductor 43 to the D input of flip-flop 82 and the input of inverter 84. The output of gate 80 on conductor 43 is the T1 output of FIR 13. The output of inverter 84 on conductor 46 is the negated T1 output of FIR 13.

Assume that the C1 and C2 signals on conductors 42 and 41, respectively, are both logic 0, so that exclusive-OR gates 74 and 80 act as non-inverting buffers. Flip-flops 70, 72 and 75 are in series and therefore perform a divide-by-eight function. The T1 signal on conductor 43 will therefore have a frequency of CLX/8 as shown in Table 2 above.

Consider now the effect of signal C2. If signal C2 changes from a logic 0 to a logic 1, gate 80 acts as an inverter. Therefore, a change in state of signal C2 introduces a 180° phase change into output signal T1 by causing gate 80 to selectively act as an inverter or a non-inverting buffer.

Signal C1 similarly causes gate 74 to selectively act as an inverter or a non-inverting buffer. However, because of the delay caused by flip-flop 75, signal C1 introduces only a 90° phase change into output signal T1. If signals C1 and C2 both change state, output signal T1 undergoes a 270° phase change (180°+90°). Similarly, if signals C1 and C2 are static (in any C1C2 logic state combination), the phase change of output T1 will be zero degrees. Signals C1 and C2 from dibit encoder 12 therefore cause output T1 to undergo the four phase shifts (0°, 90°, 180°, and 270°) required for four phase PSK operation.

It will be appreciated that, for a desired output frequency, the maximum number of segments into which a cycle of $f_{DES}$ can be broken is N, where $N = CLX/f_{DES}$. However, if the accuracy of N segments is not desired, fewer than all of the T outputs may be used. For example, only T2 and T3 might be used. An example of this is shown in the discussion below on generation of the guard tone.

It will also be appreciated that FIR 13 is not limited to the multiple-of-90° phase shifts shown in Table 4. By adding another exclusive-OR gate (not shown) between flip-flops 70 and 72, a 45° phase shift can be generated, thus allowing multiple-of-45° phase shifts. Similarly, an exclusive-OR gate (not shown) between the CLX input and flip-flop 70 causes 22.5° phase shifts, thus allowing multiple-of-22.5° phase shifts. However, in such a case, CLXA should be derived separately rather than from flip-flop 70. If $CLX = N \times f_{DES}$, the phase shifts which may, if desired, be generated by the simple insertion of exclusive-OR gates are multiples of 180°/N. In the preferred embodiment discussed above, N=8, so multiples-of-22.5° phase shifts can be obtained. However, only multiples-of-90° are required for quadrature differential PSK.

Note that the 0°, 90°, 180°, and 270° phase shifts obtainable from FIR 13 are useful both in quadrature differential PSK (QDPSK) and synchronous quadrature PSK (SQPSK). FIR 13 may therefore be used in generating both types of PSK signals. It will be appreciated that whether FIR 13 generates a QDPSK or an SQPSK signal is determined solely by how signals C1 and C2 change in response to signals S1 and S2.

Turning now to dibit encoder 12 of FIG. 3, the Q output of flip-flop 82 is connected by conductor 44 to the D input of flip-flop 83 and to the T2 output. The Q output of flip-flop 83 is connected by conductor 45 to the T3 output. Flip-flops 82 and 83 are therefore configured to perform as a two-stage shift register. Recalling that the T1 output has a frequency of CLX/8, and that flip-flops 82 and 83 are clocked at the frequency CLX, it will the be appreciated that output T2 is output T1 with a phase delay of 360/8=45°. Likewise, output T3 is output T2 with a phase delay of 45°, or, stated differently, is output T1 with a phase delay of 90°. The negated Q outputs of flip-flops 82 and 83 are connected by conductors 47 and 50, respectively, to outputs negated T2 and negated T3, respectively. Control signal RESET is connected by conductor 37 to the reset inputs of flip-flops 70, 72, 75, 82 and 83, and resets FIR 13 to a known starting state.

The CLXA output of FIR 13 is connected by conductor 40 to the clock inputs of flip-flops 90 and 92. Clock QG (600 Hz) is connected by conductor 30 to the D input of flip-flop 90. The Q output of flip-flop 90 is connected by conductor 91 to the D input of flip-flop 92. Flip-flops 90 and 92 are therefore configured to perform as a two-stage delay register for clock QG. The Q output of flip-flop 90 is also connected by conductor 91 to a first input of four-input NAND gates 94 and 95. The negated Q output of flip-flop 92 is connected by conductor 93 to a second input of each of the NAND gates 94 and 95.

It will be appreciated that, generally, the Q output of flip-flop 90, the negated Q output of flip-flop 92, or both, will be a logic 0, thereby disabling NAND gates 94 and 95 and forcing their outputs to a logic 1. However, assume that clock QG is a logic 0, so that Q and negated Q output of flip-flops 90 and 92 are logic 0 and logic 1, respectively. Now assume that clock QG changes to a logic 1. The Q output of flip-flop 90 will change to a logic 1 on the first positive-going transition of clock CLXA. At this point the Q and negated Q outputs of flip-flops 90 and 92, respectively, are both a logic 1, thereby enabling NAND gates 94 and 95. On the next positive-going transition of clock CLXA, the Q and negated Q outputs of flip-flops 90 and 92, respectively, will change to logic 1 and logic 0, respectively, thereby again disabling NAND gates 94 and 95. Control signal SPEED is connected by conductor 34 to a third input of each of NAND gates 94 and 95. When control signal SPEED is a logic 1, denoting the PSK mode, NAND gates 94 and 95 are enabled. When control signal SPEED is a logic 0, denoting the FSK mode, NAND gates 94 and 95 are disabled.

The S1 output of scrambler 17 is connected by conductor 52 to one input of exclusive-OR gate 96. The S2 output of scrambler 17 is connected by conductor 53 to the other input of gate 96 and the fourth input of NAND gate 94. The output of gate 96 is connected by conductor 97 to the fourth input of NAND gate 95. When signal 52 is a logic 0, NAND gate 94 is disabled. When signals 51 and 52 have the same states, NAND gate 95 is disabled.

The output of NAND gate 94 is connected by conductor 100 to the clock input of flip-flop 101. The negated Q output of flip-flop 101 is connected by conductor 41 to its D input and the C2 input of FIR 13. The output of NAND gate 95 is connected by conductor 102 to the clock input of flip-flop 103. The negated Q output of flip-flop 103 is connected by conductor 42 to its D input and the C1 input of FIR 13. Flip-flops 101 and 103 are therefore each configured to perform a divide-by-two function. Control signal RESET is connected by conductor 37 to the reset input of flip-flops 90, 92, 101 and 103.

Note that flip-flops 101 and 103 are clocked on the rising edge of the output of NAND gates 94 and 95, respectively. Therefore, for flip-flop 101 to change state, all of the inputs to NAND gate 94 must be a logic 1, followed by one or more of the inputs becoming a logic 0. This will occur only when control signal SPEED and signal S2 are both a logic 1, and clock QG has just transitioned from a logic 0 to a logic 1. When this sequence occurs, flip-flop 101 will change states, thereby causing signal C2 on conductor 41 to change states, which will, as previously discussed, cause a 180° phase shift in signal T1 on conductor 43.

Similarly, when signals S1 and S2 are of different states, and the QG and SPEED signals are as described immediately above, flip-flop 103 will change states, thereby causing signal C1 on conductor 42 to change states and introduce a 90° phase shift into signal T1 on conductor 43. Table 6 below shows the relationship of signals S1 and S2 to the phase shift.

TABLE 6

| S1 AND S2 V. T1 PHASE SHIFT | | |
|---|---|---|
| S1 | S2 | T1 PHASE SHIFT |
| 0 | 0 | 0° |
| 0 | 1 | 270° |
| 1 | 0 | 90° |
| 1 | 1 | 180° |

SPEED = LOGIC 1

Turn now to FIG. 4, which is a schematic diagram of the preferred embodiment of multiplexer (MUX) 14 and signal selector 15. Signal T1 is connected by conductor 43 to one input of two-input OR-gate 110, one input of four-input OR-gate 120, and one input of exclusive-OR gate 135. Signal T2 is connected by conductor 44 to one input of two-input OR-gate 123 and one input of three-input OR-gate 141. Signal T3 is connected by conductor 45 to a second input of OR-gate 120. Signal negated T1 is connected by conductor 46 to one input of four-input OR-gate 133. Signal negated T2 is connected by conductor 47 to the other input of OR-gate 110 and to one input of three-input OR-gate 137. Signal negated T3 is connected by conductor 50 to a second input of OR-gate 133, the other input of OR-gate 123, and the other input of exclusive-OR gate 135.

Clock QA is connected by conductor 22 to one input of two-input AND-gate 114. Clock QB is connected by conductor 23 to one input of two-input AND-gate 116 and one input of two-input AND-gate 131. Clock QC is connected by conductor 24 to one input of two-input AND-gate 127. Clock QD is connected by conductor 25 to the second input of OR-gate 141. Clock QE is connected by conductor 26 to the second input of OR-gate 137.

The output of OR-gate 110 is connected by conductor 111 to the input of inverter 112 and the other input of AND-gate 114. The output of AND-gate 114 is connected by conductor 115 to the third input of OR-gate 120. The output of inverter 112 is connected by conductor 113 to the other input of AND-gate 116. The output of AND-gate 116 is connected by conductor 117 to the fourth input of OR-gate 120. The output of OR-gate 120 is connected by conductor 121 to the first input of four input AND-gate 122.

The output of OR-gate 123 is connected by conductor 124 to the input of inverter 125 and the other input of AND-gate 127. The output of AND-gate 127 is connected by conductor 130 to the third input of OR-gate 133. The output of inverter 125 is connected by conductor 126 to the other input of AND-gate 131. The output of AND-gate 131 is connected by conductor 132 to the fourth input of OR-gate 133. The output of OR-gate 133 is connected by conductor 134 to the second input of AND-gate 122.

The output of exclusive-OR gate 135 is connected by conductor 136 to the third input of OR-gate 137 and the third input of OR-gate 141. The output of OR-gates 137 and 141 are connected by conductors 140 and 142, respectively, to the third input and fourth input, respectively, of AND-gate 122.

The output of AND-gate 122 on conductor 54 is the F output signal of MUX 14. It will be recalled from a review of Table 2 that clocks QA, QB, QC, QD, and QE all have a frequency of 76.8 kHz but differ in phase. It will also be recalled from the above discussion of FIR 13 that the T1, T2, T3, negated T1, negated T2, and negated T3 signals (sometimes collectively referred to as "T signals") have the same selected frequency of CLX/8, which is between 1070 Hz and 2400 Hz. These T signals gate the clocks QA through QE. The equation describing the output F of MUX 14 on conductor 54 is:

$$F = (T1 \; XOR \; T3) \, (T2 \times QE + NT2 \times QD) + \quad (3)$$

$$(T1 \times T3) \, (T2 \times QC + NT2 \times QB) +$$

$$(NT1 \times NT3) \, (T2 \times QB + NT2 \times QA)$$

where "XOR" denotes the exclusive-OR operation, and NT1, NT2, and NT3 are the negated forms of the T1, T2, and T3 signals, respectively.

Signal T2 from FIR 13 is also connected by conductor 44 to the clock input of flip-flop 161. Control signal ENABLE is connected by conductor 55 to the D input of flip-flop 161. Control signal RESET is connected by conductor 37 to the reset input of flip-flop 161. The Q output of flip-flop 161 is connected by conductor 157 to one input of two-input AND-gate 153. The negated Q output of flip-flop 161 is connected by conductor 160 to one input of two-input AND-gate 150. Flip-flop 161 therefore selectively enables one of gates 150 and 153 and disables the other gate. Note that flip-flop 161 is responsive to the ENABLE signal on conductor 55 only upon the positive-going transition of signal T2. This assures that switching of flip-flop 161, and therefore AND-gates 150 and 153, occurs at a point which minimizes DC transients and undesired frequency components in output XLS of signal selector 15.

Clock QB is also connected by conductor 23 to the other input of AND-gate 150. The output of gate 150 is connected by conductor 151 to one input of two-input OR-gate 152. Output F of MUX 14 is connected by conductor 54 to the other input of AND-gate 153. The output of gate 153 is connected by conductor 154 to the other input of OR-gate 152. The output of gate 152 is connected by conductor 155 to one input of exclusive-OR gate 156. Clock QA is also connected by conductor 22 to the other input of gate 156. The output of gate 156 is the XLS signal on conductor 56. The equation describing output XLS is:

$$XLS = (F \times Q161 + QB \times NQ161) XOR\ QA, \quad (4)$$

where Q161 and NQ161 are the Q output and negated Q output, respectively, of flip-flop 161.

If the Q output of flip-flop 161 is a logic 0, output XLS becomes: XLS=QB XOR QA. Recalling from Table 2 that clocks QA and QB both have a frequency of 76.8 kHz, and clock QB lags clock QA by 90°, it will be appreciated that output XLS is then a 153.6 kHz square wave with a 50% duty cycle.

Assume now that the Q output of flip-flop 161 is a logic 1 so that output XLS becomes: XLS=F XOR QA. Inserting equation (3) for signal F into equation (4) and reducing yields, for the case where Q161 is a logic 1:

$$XLS = [T1\ XOR\ T3]\ [T2(QA\ XOR\ QE)\ + \quad (5)$$

$$T2(QA\ XOR\ QD)] + [T1 \times T3]\ [T2 + (QA\ XOR\ QB)] +$$

$$[NT1 \times T2 \times NT3]\ [QA\ XOR\ QB]$$

Recalling the phase delays of Table 2, and utilizing equation (5) for output XLS, Table 7 lists the possible values of output XLS.

TABLE 7

| | | | OUTPUT XLS VALUES | |
|---|---|---|---|---|
| T1 | T2 | T3 | XLS (LOGIC) | XLS (AVERAGE VALUE) |
| 0 | 0 | 0 | 0 | 0.000 |
| 0 | 0 | 1 | QA + QD | 0.297 |
| 0 | 1 | 0 | QA + QB | 0.500 |
| 0 | 1 | 1 | QA + QE | 0.703 |
| 1 | 0 | 0 | QA + QD | 0.297 |
| 1 | 0 | 1 | QA + QB | 0.500 |
| 1 | 1 | 0 | QA + QE | 0.703 |
| 1 | 1 | 1 | 1 | 1.000 |

It will be appreciated from Table 7 that output XLS on conductor 56 has five possible average output values: 0.000, 0.297, 0.500, 0.703, and 1.000. It will also be appreciated that, excluding the 0.500 value, these average values are approximately the stair step values specified in Peck U.S. Pat. No. 4,049,909: 0.000, 0.293, 0.707, and 1.000. The 0.500 value in Table 7 occurs in the PSK mode when the serial data input stream causes a phase shift such that T1, T2, T3=010 or 101. The 0.500 value also occurs in the idle mode (XLS=QB XOR QA).

As previously stated, a change in the EN signal is only recognized upon the rising edge of the T2 signal. By recalling the delay relationship between T1, T2, and T3, it will be appreciated that a change in the EN signal will be recognized when the T1 T2 T3 time sequence is 10X, X10.

Therefore, when the EN signal changes from a logic 0 to a logic 1, output XLS will switch from 0.500 (QB XOR QA) to F XOR QA at the point when F XOR QA is changing from 0.293 or 0.500, to 0.500 or 0.703. Therefore, output XLS will smoothly switch from the idle mode (QB XOR QA) to F XOR QA at the point which minimizes the DC switching transients.

Likewise, when the EN signal changes from a logic 1 to a logic 0, output XLS will switch from F XOR QA to QB XOR QA at the point when F XOR QA is changing from 0.293 or 0.500, to 0.500 or 0.703. Therefore, output XLS will smoothly switch from F XOR QA to the idle mode (QB XOR QA) at the point which minimizes the DC switching transients.

It will be appreciated, from an inspection of equations (3), (4) and (5), that signal XLS may be generated by two different methods. First, by using T1, T2, T3, etc. to select a desired phase-delayed clock, and then exclusive-OR'ing this clock with QA. Second, by using T1, T2, T3, etc. to directly select a clock with the desired pulsewidth (e.g.—QA XOR QD). In the first case, clock generator 10 produces clocks with different phase delays. In the second case, clock generator 10 produces clocks with different pulsewidths. Both methods yield the same signal for XLS.

FIG. 5 is a diagram of signal filter 16. Output XLS of signal selector 15 is connected by conductor 56 to the input of low pass filter 170. Filter 170 is a second-order low pass Butterworth filter with pole frequencies of approximately 6 kHz. Filter 170 suppresses any 76.8 kHz and 153.6 kHz components in output signal XLS and, as explained above, performs the pulsewidth-modulated-signal-to-analog-signal conversion. In the preferred embodiment, suppression of the 76.8 and 153.6 kHz frequency components prevents aliasing since switched capacitor selectable band filter 172 has a clock frequency of 153.6 kHz. Filter 170, because of its low pass characteristic, converts the 153.6 kHz, pulse-width-modulated output XLS into an approximately sinusoidal waveform. Methods of construction of low pass filter 170 are known to one of ordinary skill in the art. The output of filter 170 is connected by conductor 171 to the input of filter 172.

Filter 172 is a switched capacitor filter with two selectable center frequencies: 1200±420 Hz (−1 dB), and 2400±420 Hz (−1 dB). When the 1200 Hz band is selected, the output of filter 172 is at least 26 dB down for frequencies greater than 1800 Hz. When the 2400 Hz band is selected, the output of filter 172 is at least 26 dB down for frequencies less than 1800 Hz. Filter 172 therefore provides a clean XSIG output signal by suppressing harmonics and further suppressing any residual 76.8 and 153.6 kHz components present on conductor 171. The output of filter 172 is the XSIG signal on conductor 57. Methods of construction of filter 172 are well known to one of ordinary skill in the art.

Control signal PSKC is connected by conductor 35 to one input of two-input AND-gate 175. Control signal SPEED is connected by conductor 34 to the input of inverter 180 and the other input of AND-gate 175. The output of gate 175 is connected by conductor 176 to one input of two-input OR-gate 177.

The output of inverter 180 is connected by conductor 181 to one input of two-input AND-gate 182. Control signal FSKA is connected by conductor 20 to the other input of AND-gate 182. The output of gate 182 is connected by conductor 183 to the other input of OR-gate 177. The output of OR-gate 177 is connected by conductor 184 to the band select input (BAND) of filter 172. Table 8 shows the band selected in response to control signals SPEED, PSKC, and FSKA.

TABLE 8

FILTER 172 BAND SELECTION

| CONTROL SIGNAL | | | BAND |
|---|---|---|---|
| SPEED | PSKC | FSKA | SELECTED |
| 0 | X | 0 | 1200 Hz |
| 0 | X | 1 | 2400 Hz |
| 1 | 0 | X | 1200 Hz |
| 1 | 1 | X | 2400 Hz |

X = DON'T CARE

It will therefore be appreciated that control speeds SPEED, PSKC, and FSKA automatically cause filter 172 to select the proper band for the selected mode of operation. It will also be appreciated that all the control and data signals up to filter 170 are digital signals, and that, from filter 170 to the XSIG output on conductor 57, there is only one analog signal path. The present invention therefore eliminates the need for the closely-matched, parallel analog paths and/or the digital-to-analog converters of the prior art.

At this point, a summary of the operation may be useful. Referring to FIG. 2, assume first that the FSK mode is desired. Control signals SPEED and RESET will be a logic 0, control signal ENABLE will be a logic 1, control signal PSKC is not used and may be either a logic 0 or a logic 1, SERIAL DATA IN is not used and may be either a logic 0 or a logic 1, control signal FSKA will be either a logic 0 or a logic 1 depending upon whether the preferred embodiment is used in the originating or the answering device, and control signal FSKB will alternate between a logic 0 and a logic 1 in accordance with the data being transmitted. Clock generator 10 will generate clocks QA through QJ, with the frequency of clock QJ being dependent upon the FSK mode and data. CLX generator 11 passes clock QJ through to its CLX output and to FIR 13.

Dibit encoder 12 is disabled (FSK mode) and has no phase-shifting effect. FIR 13 divides the CLX signal by eight to generate the desired FSK frequency at its T1 and negated T1 outputs, and provides 45° and 90° delayed versions of the T1 and negated T1 outputs to its T2, T3, negated T2 and negated T3 outputs.

MUX 14 gates and combines clocks QA through QE in response to the T signals above to provide a variable-phase 76.8 kHz signal at output F. Signal selector 15 exclusive-OR's output signal F with clock QA to produce a variable-pulsewidth 153.6 kHz signal at output XLS. Since output XLS is a logic signal, it may be considered to be composed of two components: a variable-pulsewidth 153.6 kHz signal with a peak-to-peak range of 1.0 and a DC signal with an average value proportional to the pulsewidth.

Signal filter 16 removes the 153.6 kHz component and passes, after filtering, the DC component to its XSIG output. The XSIG output is a sinusoidal wave with the FSK frequency selected.

Assume now that the PSK mode is desired. Control signals SPEED and ENABLE will be a logic 1, control signal RESET will be a logic 0, control signals FSKA and FSKB are not used and may be either a logic 0 or a logic 1, control signal PSKC will be either a logic 0 or a logic 1 depending upon whether the preferred embodiment is used in the originating or the answering device, and the SERIAL DATA IN signal will be the data to be transmitted.

CLX generator 11 passes either clocks QH or QI, depending upon whether answer or originate mode is selected, to its CLX output. Scrambler 17 accepts the serial data input, scrambles it, and provides the scrambled dibit to dibit encoder 12. Dibit encoder 12 accepts the scrambled dibit from scrambler 17 and provides phase-shift signals C1 and C2 to FIR 13.

FIR 13 divides CLX by eight to produce the desired PSK carrier frequency, and responds to the C1 and C2 signals to produce a 0°, +90°, +180°, or 270° phase shift in outputs T1 and negated T1. Outputs T2 and negated T2, and outputs T3 and negated T3 are phase-delayed versions of outputs T1 and negated T1.

MUX 14 gates and combined clocks QA through QE in response to the T signals above to provide a variable-phase 76.8 kHz signal at output F. Signal selector 15 exclusive-OR's output signal F with clock QA to produce a variable-pulsewidth 153.6 kHz signal at output XLS. Since output XLS is a logic signal, it may be considered to be composed of two components: a variable-pulsewidth 153.6 kHz signal with a peak-to-peak range of 1.0 and a DC signal with an average value proportional to the pulsewidth.

Signal filter 16 removes the 153.6 kHz component and passes, after filtering, the DC component to its XSIG output. The XSIG output is a sinusoidal wave with the PSK carrier frequency selected and with a baud-to-baud phase shift determined by the serial data input on conductor 51.

Figure 6:
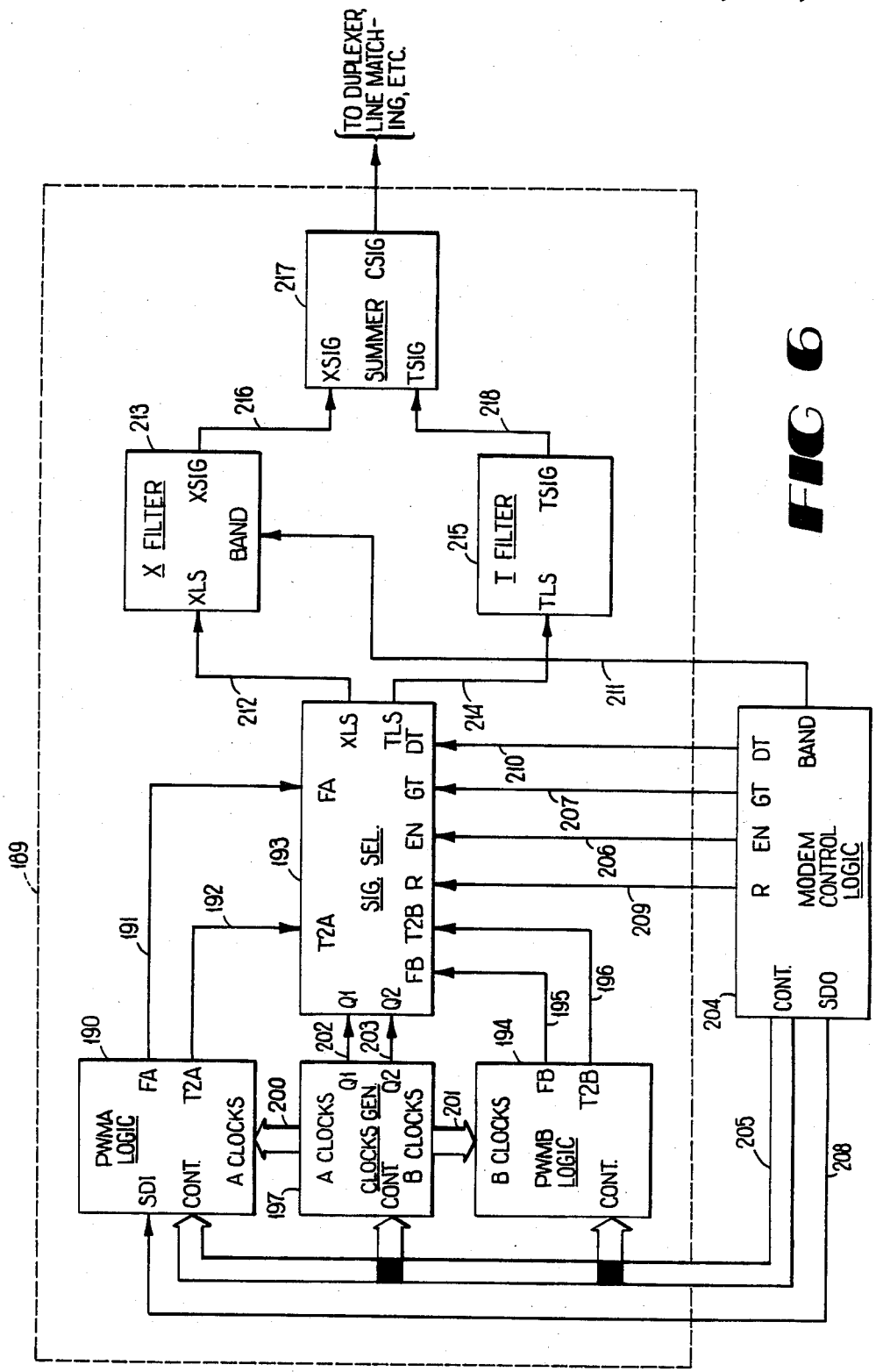
FIG. 6 is a block diagram of the preferred embodiment of the present invention for generating the various signals used in conjunction with a modem.

Turning now to FIG. 6, which is a block diagram of the preferred embodiment of the present invention as an FSK/PSK/dual-tone multiple-frequency (DTMF)/answer tone (AT)/guard tone (GT) generator 189 for use in a modem.

Pulsewidth modulator A (PWMA) logic 190 generates signals for the FSK, PSK, and AT modes, and the high-group tones for the DTMF mode. PWMB logic 194 generates signals for the GT mode and the low-group tones for the DTMF mode. Clock generator 197 generates the various clocks required by PWMA logic 190, PWMB logic 194 and signal selector 193. The A clocks output and B clocks output of clocks generator 197 are connected by clock busses 200 and 201, respectively, to the A clocks input of PWMA logic 190 and the B clocks input of PWMB logic 194, respectively. The Q1 and Q2 clock outputs of clock generator 197 are connected by conductor 202 and 203, respectively, to the Q1 input and Q2 input, respectively, of signal selector 193.

The FA and T2A outputs of PWMA logic 190 are connected by conductors 191 and 192, respectively, to the FA and T2A inputs, respectively, of signal selector 193. The FA and T2A outputs of PWMA Logic 190 correspond to the F and T2 outputs, respectively, of FIGS. 4 and 3, respectively. However, the logic equation defining FA will depend upon whether the FSK, PSK, DTMF, or AT mode is selected.

The FB and T2B outputs of PWMB logic 194 are connected by conductors 195 and 196, respectively, to the FB and T2B inputs, respectively, of signal selector 193. The FB and T2B outputs of PWMB logic 194 also correspond to the F and T2 outputs, respectively, of FIGS. 4 and 3, respectively. The logic equation defining FB will depend upon whether the DTMF mode or the GT mode is selected.

Modem control logic 204 controls whether the PSK, FSK, AT, GT or DTMF mode is selected and, in the PS mode, provides the serial data input stream to PWMA logic 190. Modem control logic 204 also controls the operation of signal selector 193 and the band selection of XFILTER 213. The serial data output (SDO) of modem control logic 204 is connected by conductor 208 to the serial data input (SDI) of PWMA logic 190. The CONTROL bus output of modem control logic 204 is connected by control bus 205 to the CONTROL bus inputs of PWMA logic 190, PWMB logic 194, and clocks generator 197. The XLS enable (EN), guard tone enable (GT), DTMF tone enable (DT), and reset (R) outputs of modem control logic 204 are connected by conductors 206, 207, 210 and 209, respectively, of signal selector 193. The EN signal configures signal selector 193 for the FSK, PSK and AT modes, the GT signal configures signal selector 193 for the GT mode, and the DT signal configures signal selector 193 for the DTMF mode. The reset signal configures signal selector 193 to the idle mode. The BAND output of modem control logic 204 is connected by conductor 211 to the BAND input of XFILTER 213. The BAND signal causes XFILTER 213 to select a 1200 Hz or 2400 Hz center frequency for its band pass function.

Signal selector 193 has two outputs: XLS and TLS. The XLS output is used for the FSK, PSK and AT modes. The TLS output is used for the DTMF and GT modes. The XLS output of signal selector 193 is connected by conductor 212 to the XLS input of XFILTER 213. The TLS output of signal selector 193 is connected by conductor 214 to the TLS input of TFILTER 215.

XFILTER 213 contains the low pass filter 170 and switched capacitor selectable band filter 172 of signal filter 16 of FIG. 5. XFILTER 213 is only used in the FSK, PSK, and AT modes and performs the pulse-width-modulated-signal-to-analog-signal conversion and band pass filtering described in the above discussion of signal filter 16.

TFILTER 215 is only used in the DTMF and GT modes. TFILTER 215 is a third-order Chebyshev filter having a real pole at 2150 Hz, a pair of comlex poles at 1700 Hz, and a Q of 1.4. TFILTER 215 is capacitor-input-coupled to remove any steady-state DC component. TFILTER 215 performs the pulsewidth-modulated-signal-to-analog-signal conversion described in the discussion of signal filter 16 and reduces the amplitude of the harmonics in the DTMF and GT tones. Methods of construction of TFILTER 215 are well known to one of ordinary skill in the art. It will be appreciated that filters other than a Chebyshev filter may be used and that the order and pole frequencies of the filter are not critical. The characteristics of TFILTER 215 only need to be such that the DTMF and GT tones be passed, that harmonics of the DTMF and GT tones are suppressed, and that the 153.6 kHz signal be suppressed.

The XSIG output of XFILTER 213 is connected by conductor 216 to the XSIG input of summer 217. The TSIG output of TFILTER 215 is connected by conductor 218 to the TSIG input of summer 217. Summer 217 adds the XSIG and TSIG signals together and places the sum on its CSIG output. The CSIG output of summer 217 is connected by conductor 220 to other modem circuits (not shown) such as a duplexer, line matching and isolation transformer, etc. Summer 217 amplifier or attenuates, as appropriate, the XSIG and TSIG signals to produce the desired CSIG output voltage. In the preferred embodiment, the XSIG voltage gain is unity and the TSIG voltage gain is 1.6. Methods of construction of summer 217 are well known to one of ordinary skill in the art.

It will be appreciated that, with one exception, summer 217 is handling only one active signal: XSIG or TSIG. The one exception is the PSK mode with guard tone. In this case summer 217 is handling both XSIG (the PSK signal) and TSIG (the guard tone) and is combining them. It will also be appreciated that the ratio of XSIG/TSIG is not critical, and that any changes in the gain provided to the XSIG and TSIG signals will have minimal effect. Therefore, the summer 217 need not have either the precision gain or temperature stability required by the invention in the aforementioned Peck patent.

Clocks generator 197 generates the clocks listed in Table 9. PWMA logic 190 contains a CLX generator, a scrambler, a dibit encoder, a finite impulse response (FIR) filter, and a multiplexer (MUX) similar to those previously described. The logic equation for FA, in the PSK, FSK, and AT modes is:

$$FA_{PSK/FSK/AT} = (T1A \times T3A) \times (T2A \times Q5 + NT2A \times Q2) + (NT1A \times T3A) \times (T2A \times Q2 + NT2A \times Q1) + (T1A \text{ XOR } T3A) \times (T2A \times Q3 + NT2A \times Q4) \quad (6)$$

where XOR denotes the exclusive-OR operation. T1A, T2A, T3A and their negated forms NT1A, NT2A, and NT3A correspond to T1, T2, T3 and their negated forms, respectively, of FIG. 3. Clocks Q1 through Q5 are as shown in Table 9. The frequency of T1A, T2A, T3A and their negated forms will be either 1200 Hz (originate) or 2400 Hz (answer) in the PSK mode. It should be recalled that, in the PSK mode, the phase of T1A and NT1A may undergo 0°, 90°, 180°, or 270° phase shift, depending upon the serial data input stream. Note that $FA_{PSK}$ XOR Q1 yields five possible duty cycles: 0.0, 0.297, 0.5, 0.703, and 1.0. The 0.5 value represents the 0 volt output state of XFILTER 213 and appears at idle (no data) and in conjunction with certain 180° and 270° phase shifts of T1A such that T1A, T2A, T3A = 101 or 010.

TABLE 9

| CLOCK | CLOCK VALUES FREQUENCY/PHASE (degrees) |
| --- | --- |
| Q1 | 76.8 kHz/0 |
| Q2 | 76.8 kHz/−90 |
| Q3 | 76.8 kHz/−126.5625 |
| Q4 | 76.8 kHz/−53.4375 |
| Q5 | 76.8 kHz/−180 |
| Q6 | 76.8 kHz/−140.625 |
| Q7 | 76.8 kHz/−45 |
| Q8 | 76.8 kHz/−112.5 |
| Q9 | 76.8 kHz/−73.125 |
| Q10 | 76.8 kHz/−219.375 |
| Q11 | 76.8 kHz/−196.875 |
| Q12 | 76.8 kHz/−163.125 |
| QPSKHI | 19,200 Hz |

TABLE 9-continued

| CLOCK | CLOCK VALUES FREQUENCY/PHASE (degrees) |
|---|---|
| QPSKLO | 9,600 Hz |
| QPSKAT | 16,800 Hz |
| QPSKGT | 10,800 Hz |
| QFSK1 | 8560 Hz |
| QFSK2 | 10,160 Hz |
| QFSK3 | 16,200 Hz |
| QFSK4 | 17,800 Hz |
| QDTMFHI1 | 9,672 Hz |
| QDTMFHI2 | 10,688 Hz |
| QDTMFHI3 | 11,816 Hz |
| QDTMFHI4 | 13,064 Hz |
| QDTMFLO1 | 5576 Hz |
| QDTMFLO2 | 6160 Hz |
| QDTMFLO3 | 6816 Hz |
| QDTMFLO4 | 7528 Hz |
| Q1200 | 1200 Hz |
| Q2400 | 2400 Hz |

Although the frequencies and phases given in Table 9 are the preferred values, it may be desirable to use frequencies/phases which are slightly different so as to allow for ease of generation using a primary clock and divider chains.

In the FSK mode, the frequency of T1, T2, T3 and their negated forms will be, at any instant, a selected one of the FSK frequencies, dependent upon the data being sent and whether the preferred embodiment is being used in the answer or the originate mode.

In the AT mode, T1, T2, T3 and their negated forms will have a frequency of 2100 Hz, the answer tone frequency.

Note that since T1 is not subject to phase shifts in the FSK and AT modes the condition T1A, T2A, T3A=101 or 010 will not occur and the terms $NT2A \times Q2$ and $T2A \times Q2$ are not required. However, these terms are left in the logic equation for FA for the FSK and AT modes so that the same logic circuitry can be used to generate FA in the PSK, FSK, and AT modes.

In the DTMF mode, the logic equation for FA is:

$$FA_{DTMFHI} = (T1A \times T3A) \times (T2A \times Q6 + NT2A \times Q2) + \quad (7)$$
$$(NT1A \times NT3A) \times (T2A \times Q2 + NT2A \times Q7) +$$
$$(T1A \text{ XOR } T3A) \times (T2A \times Q8 + NT2A \times Q9).$$

Clocks Q2 and Q6 through Q9 are as listed in Table 9. The frequency of T1A, T2A, T3A and their negated forms will be a selected one of the high-group of DTMF tones. Again note that the conditions T1A, T2A, T3A=101 or 010 do not occur since T1 is not subject to phase shifting. Therefore, the $T2A \times Q2$ and $NT2A \times Q2$ terms are not required. However, they are left in the logic equation so that the same circuitry can be used to generate $FA_{DTMFHI}$ as is used to generate $FA_{PSK}$ by substituting clocks Q6, Q7, Q8 and Q9 for clocks Q5, Q1, Q3 and Q4, respectively.

The mean phase of the clocks Q6 and Q10 through Q12, used in generating $FA_{DTMFLO}$, is $-180°$, referred to below as QFBLO.

Note that, excluding the Q2 terms, $FA_{DTMFHI}$ XOR QFBLO yields the four duty cycles 0.21875, 0.375, 0.59375, and 0.750. Note that the mean of these four duty cycles is 0.484375, and the maximum range is $0.78125 - 0.25 = 0.53125$, whereas the mean of the duty cycles for the PSK, FSK, and AT modes is 0.5 and the maximum range is 1.0. The DTMF high-group output is therefore only 53.125% of the PSK, FSK and AT outputs. As is shown below, the DTMF low-group output is 43.75% of the PSK, FSK and AT outputs. The use of clocks Q6 through Q9 for the DTMF high-group tones and clocks Q6 and Q10 through Q12 for the DTMF low-group tones therefore automatically provides the desired DTMF high-group to DTMF low-group ratio of 1.7 dB, thereby avoiding the need for analog scaling networks.

PWMB logic 194 contains a CLX generator, a FIR filter, and a MUX similar to those previously described. The logic equation for FB, in the DTMF mode, is:

$$FB_{DTMFLO} = T1B \times T3B \times Q10 + \quad (8)$$
$$NT1B \times NT3B \times Q6 +$$
$$(T1B \text{ XOR } T3B) \times (T2B \times Q11 + NT2B \times Q12).$$

Clocks Q6 and Q10 through Q12 are as listed in Table 9. The frequency of T1B, T2B, T3B and their negated forms will be the selected one of the low group of DTMF tones.

The mean phase of clocks Q6 through Q9, used in generating $FA_{DTMFHI}$, is $-92.8125$ degrees, referred to below as QFAHI. The product $FB_{DTMFLO}$ XOR QFAHI yields four duty cycles: 0.265625, 0.390625, 0.578125, and 0.703125. These four duty cycles yield a mean duty cycle of 0.484375, and a maximum range of 0.4375. Therefore, the DTMF low-group output is 43.75% of the PSK, FSK and AT outputs. As previously stated, this yields the desired ratio of +1.7 dB for DTMF high-group output divided by DTMF low-group output.

The logic equation for FB, in the GT mode, is:

$$FB_{GT} = T2B \times T3B \times Q11 + NT2B \times NT3B \times Q12 + \quad (9)$$
$$(T2B \text{ XOR } T3B) \times Q5.$$

Clocks Q5, Q11 and Q12 are as defined in Table 9. The frequency of T2B, T3B and their negated forms is the 1800 Hz guard tone frequency. Note that the T1 and negated T1 terms are not used. The guard tone is therefore effectively filtered by a two-tap (T2B, T3B) FIR with a CLK frequency of $6 \times 1800$ Hz (10,800 Hz). In the GT mode, the FIR in PWMB logic 194 performs a CLX/6 function, instead of the CLX/8 function used in the other modes. Use of a CLX/6 function causes T3B to lag T2B by 60°, instead of the 45° lag for the CLX/8 function. Methods of construction of a FIR having a selectable divide-by-six or divide-by-eight function are well known to one of ordinary skill in the art.

The product $FB_{GT}$ XOR Q2 yields three duty cycles: 0.40625, 0.50, and 0.59375. These three duty cycles have a mean of 0.5 and a maximum range of 0.1875. The guard tone output is therefore 18.75% of the PSK, FSK and AT output.

Use of a two-tap FIR to generate $FB_{GT}$ produces zeros at the third and fifth harmonics with folded response outputs at the 11th and 13th harmonics and simplifies the guard tone filtering requirements.

It will be appreciated from the above that FA and FB are 76.8 kHz clocks with the phase of the clock being determined by T1A, T1B, etc. Signal selector 193 exclusive-OR's FA and FB with the appropriate signal so that the XLS and TLS outputs are pulsewidth-modulated 153.6 kHz clocks. Table 10 defines XLS and TLS for the different modes.

TABLE 10

| | XLS, TLS EQUATIONS | |
|---|---|---|
| MODE | XLS | TLS |
| IDLE | Q2 XOR Q1 | Q2 XOR Q1 |
| FSK | $FA_{FSK}$ XOR Q1 | Q2 XOR Q1 |
| PSK, NO GUARD TONE | $FA_{PSK}$ XOR Q1 | Q2 XOR Q1 |
| PSK, AND GUARD TONE | $FA_{PSK}$ XOR Q1 | Q2 XOR $NFB_{GT}$ |
| ANSWER TONE (AT) | $FA_{AT}$ XOR Q1 | Q2 XOR Q1 |
| DTMF | Q2 XOR Q1 | (1) $FA_{DTMFHI}$ XOR $NFB_{DTMFLO}$ |
| | | (2) $FA_{DTMFHI}$ XOR Q1 |
| | | (3) Q2 XOR $NFB_{DTMFLO}$ |
| | | (4) Q2 XOR Q1 |

Note:
NFBGT = negated FBGT
$NFB_{DTMFLO}$ = negated $FB_{DTMFLO}$

From Table 10 it will be appreciated that XLS has two possible logic equations. In the DTMF mode XLS=Q2 XOR Q1, which yields a 153.6 kHz, 50% duty cycle clock. In the FSK, PSK, and AT modes, and recalling from Table 9 that Q5=NQ1 (negated Q1), $$XLS = (T1A \times T3A) \times NT2A \times (Q2 \; XOR \; Q5) + \quad (10)$$

$$(NT1A \times NT3A) \times (T2A \times (Q2 \; XOR \; Q5) + NT2A) +$$

$$(T1A \; XOR \; T3A) \times (T2A \times (Q3 \; XOR \; Q5) + NT2A \times (Q4 \; XOR \; Q5)),$$

which, it will be recognized, has a duty cycle ranging from 0 to 100 percent.

From Table 10 it will be appreciated that TLS has several possible logic equations. In the FSK mode, AT mode, and PSK with no guard tone mode, TLS=Q2 XOR Q1, which yields a 153.6 kHz, 50% duty cycle clock.

In the PSK and GT mode (PSK mode, answering station), $$TLS = T2B \times T3B \times (Q11 \; XOR \; Q2) + \quad (11)$$

$$NT2B \times NT3B \times (Q12 \; XOR \; Q2) +$$

$$(T2B \; XOR \; T3B) \times (Q1 \; XOR \; Q2),$$

which, it will be recognized, has a duty cycle ranging from approximately 40 to 60 percent.

In the DTMF MODE, TLS has four possible logic equations. Between DTMF tone signals, DLS is Q2 XOR Q1. When both tones of DTMF signal are being generated, TLS is $FA_{DTMFHI}$ XOR $NFB_{DTMFLO}$. This yields duty cycles between 0 and approximately 97 percent. In order to obtain a clean turn on/turn off with a minimal DC transient $FA_{DTMFHI}$ and $FB_{DTMFLO}$ are activated/deactivated only on the rising edge of T2A and T2B, respectively. Since T2A and T2B have different frequencies, $FA_{DTMFHI}$ and $FB_{DTMFLO}$ will generally be activated/deactivated at different times.

Therefore, when $FA_{DTMFHI}$ is active but $FB_{DTMFLO}$ is not active, TLS equals $FA_{DTMFHI}$ XOR Q1. Conversely, when $FB_{DTMFLO}$ is active but $FA_{DTMFHI}$ is not active, TLS equals Q2 XOR $NFB_{DTMFLO}$. As previously stated, the mean phase of $FA_{DTMFHI}$ is $-92.8125°$, and the phase of Q2 is $-90°$, so switching between TLS=$FA_{DTMFHI}$ XOR $NFB_{DTMFLO}$ and TLS=Q2 XOR $NFB_{DTMFLO}$ causes minimal disruption of the DTMF low group tone. The mean phase of $NFB_{DTMFLO}$ is 0°, and the phase of Q1 is 0°, so switching between TLS=$FA_{DTMFHI}$ and TLS=$FA_{DTMFHI}$ XOR Q1 causes minimal disruption of the DTMF high group tone.

Also, the mean phase of $NFB_{GT}$ is 0°, and the phase of Q1 is 0°, so switching between TLS=Q2 XOR $NF_{BGT}$ and TLS=Q2 XOR Q1 causes minimal transients in the TLS output.

Similarly, the mean phase of $FA_{PSK/FSK/AT}$ is $-90°$, and the phase of Q2 is $-90°$, so switching between XLS=$FA_{PSK/FSK/AT}$ XOR Q1 and XLS=Q2 XOR Q1 causes minimal transients in the XLS signal.

Figure 7:
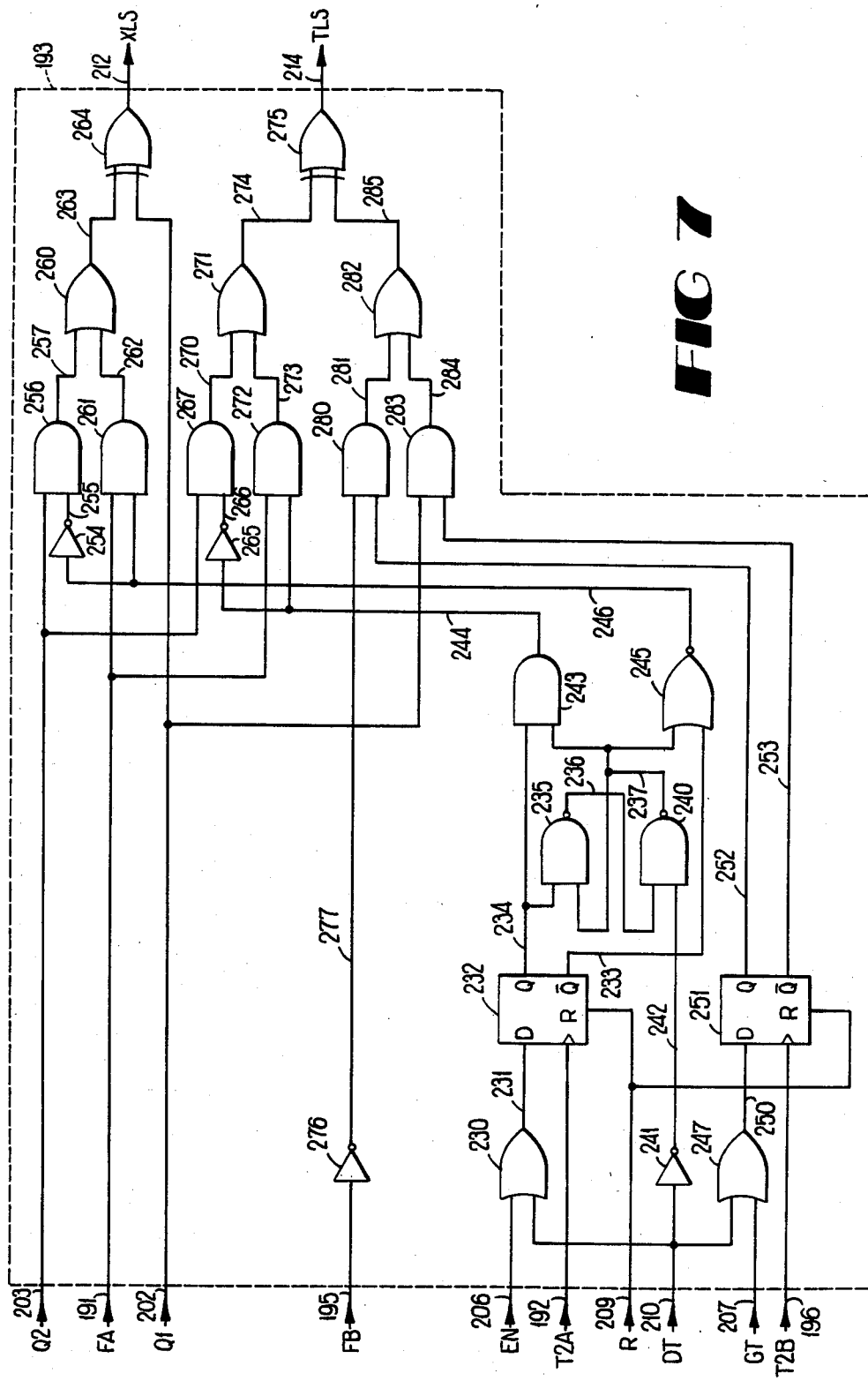
FIG. 7 is a schematic diagram of the dual output signal selector of the preferred embodiment.

FIG. 7 is a schematic diagram of signal selector 193. Data enable (EN) conductor 206 is connected to one input of two-input OR-gate 230. DTMF tone enable (DT) conductor 210 is connected to the other input of OR-gate 230, the input of inverter 241, and one input of two input OR-gate 247. The output of OR-gate 230 is connected by conductor 231 to the data (D) input of flip-flop 232. The Q output of flip-flop 232 is connected by conductor 234 to one input of the two-input NAND-gate 235 and one input of two-input AND-gate 243. The output of NAND-gate 235 is connrected by conductor 236 to one input of two-input NAND gate 240. The output of inverter 241 is connected by conductor 242 to the other input of NAND-gate 240. The output of NAND-gate 240 is connected by conductor 237 to the other input of NAND-gate 235, the other input of AND-gate 243, and one input of two-input NOR-gate 245. The negated Q output of flip-flop 232 is connected by conductor 233 to the other input of NOR-gate 246. Signal T2A on conductor 192 is connected to the clock input of flip-flop 232. It will be appreciated from an analysis of the operation of components 230, 232, 235, 240, 241, 243 and 245 that a change in state of the EN and DT signals will affect the output of gates 243 and 245 only upon the rising edge of signal T2A.

The guard tone enable (GT) signal on conductor 207 is connected to the other input of OR-gate 247. The output of OR-gate 247 is connected by conductor 250 to the D input of flip-flop 251. Signal T2B on conductor 196 is connected to the clock input of flip-flop 251. It will be quickly appreciated that a change in state of the DT and GT signals will affect the outputs of flip-flop 251 only upon the rising edge of signal T2B. The reset (R) signal on conductor 209 is connected to the reset (R) input of flip-flops 232 and 251 and is used to set signals XLS and TLS to the idle mode.

The output of NOR-gate 245 is connected by conductor 246 to one input of two-input AND-gate 261 and the input of inverter 254. The output of inverter 254 is connected by conductor 255 to one input of two-input AND-gate 256. Clock Q2 on conductor 203 is connected to the other input of AND-gate 256 and one input of two-input AND-gate 267. Signal FA on conductor 191 is connected to the other input of AND-gate 261. The output of AND-gate 256 is connected by conductor 257 to one input of two-input OR-gate 260. The output of AND-gate 261 is connected by conductor 262 to the other input of OR-gate 260. The output of OR-gate 260 is connected by conductor 263 to one input of exclusive-OR gate 264. Clock Q1 on conductor 202 is connected to the other input of exclusive-OR gate 264 and to one input of two-input AND-gate 283. The output of exclusive-OR gate 264 is the XLS signal on conductor 212. Signal XLS therefore has two possible values: Q2 XOR Q1, and FA XOR Q1. Since the second value only occurs during the PSK, FSK, or AT modes, the XLS signal is either Q2 XOR Q1, or FA$_{PSK/FSK/AT}$ XOR Q1.

The output of AND-gate 243 is connected by conductor 244 to the input of inverter 265 and the other input of AND-gate 272. The output of inverter 265 is connected by conductor 266 to the other input of AND-gate 267. The output of AND-gates 267 and 272 are connected by conductors 270 and 273, respectively, to the first input and second input, respectively, of two-input OR-gate 271. The output of OR-gate 271 is connected by conductor 274 to one input of exclusive-OR gate 275.

The Q output of flip-flop 251 is connected by conductor 252 to one input of two-input AND-gate 280. The negated Q output of flip-flop 251 is connected by conductor 253 to the other input of AND-gate 283. Signal FB on conductor 195 is connected to the input of inverter 276. The output of inverter 276 is connected by conductor 277 to the other input of AND-gate 280. The output of AND-gates 280 and 283 are connected by conductors 281 and 284, respectively, to the first input and second input of two-input OR-gate 282. The output of OR-gate 282 is connected by conductor 285 to the other input of exclusive-OR gate 275. The output of exclusive-OR gate 275 is the TLS signal on conductor 214.

Signal TLS therefore has five possible values since signal FB may be selected to be either FB$_{DTMFLO}$ or FB$_{GT}$. These values are: FA$_{DTMFHI}$ XOR Q1, FA$_{DTMFHI}$ XOR NFB$_{DTMFLO}$, Q2 XOR NFB$_{DTMFLO}$, Q2 XOR NFB$_{GT}$, and Q2 XOR Q1.

Since the XLS and TLS signals are controlled by the output of gates 243 and 245 and of flip-flop 251, and since, as previously stated, gates 243 and 245 and flip-flop 251 can change states only upon the rising edge of signals T2A and T2B, the XLS and TLS signals can switch between their possible states only on the rising edge of signals T2A and T2B. As previously states, switching on the rising edge of signals T2A and T2B minimizes DC transients and distortion of signals XLS and TLS.

For the DTMF mode, that the clocks used for generating the high group tone, Q6, Q7, Q8, and Q9, when exclusive-OR'd with clock Q1, produce duty cycles of 0.78125, 0.25, 0.625, and 0.40625, respectively. The mean of these duty cycles is 0.515625. It will therefore be appreciated that the duty cycles for the high group is DTMF mode will be 0.515625±0.265625 and 0.515625±0.109375. Therefore, the selected duty cycles are symmetric about the mean duty cycle. It will also be appreciated, by a similar analysis, that the selected duty cycles are also symmetric about a mean duty cycle for the low group in the DTMF mode, the PSK mode, the FSK mode, the AT mode, and the GT mode. Therefore, symmetry of the XLS and TLS outputs about a mean are obtainable by proper selection of the phase delays for the clocks used to generate XLS and TLS.

It will also be appreciated that the present invention is not limited to quadrature-differential PSK but, by using only the C2 input of dibit encoder 12 of FIG. 2, can be used for binary (0° or 180° shift) PSK as well.

Although a two-tap or a three-tap FIR is acceptable for most applications, it will be recognized that if additional resolution is required, additional taps may be provided by using additional dividers, additional shift registers, and a higher multiple of the output frequency for the FIR input frequency.

It will also be appreciated that the present invention is not limited to discrete frequency generation but, by using a frequency modulated signal for the CLX input to the FIR, a frequency modulated output signal will occur at XLS or TLS. For example, the CLX signal could have P different frequencies possible. The CLX signal would step from the low frequency to the high frequency in discrete steps so as to simulate an FM signal. It will be appreciated that, in such a case, an additional FIR and MUX could be used to generate the series of discrete frequency steps needed to approximate an FM frequency change. In such a case, given a lower frequency $f_L$, an upper frequency $f_u$, and a frequency range $f_R = f_u - f_L$, the discrete steps might conveniently be: $f_L$, $f_L + 0.297\ f_R$, $f_L + 0.5\ f_R$, $f_L + 0.703\ f_R$, and $f_U$.

It will also be appreciated that for example, the circuit of FIG. 6 is well suited for components 190, 193, 194, and 197 to be integrated onto a single logic chip, thereby reducing the number of discrete components.

Since many other embodiments of the present invention may suggest themselves to those skilled in the art based upon the foregoing disclosure, the present invention is to be limited only by the claims below.

I claim:

1. A digital modulator for generating a modulated analog waveform at a desired frequency, comprising:
    a first clock having a frequency of N times said desired frequency, N being an integer greater than one;
    divider means connected to said first clock for providing a second clock of said desired frequency by dividing the frequency of said first clock by N;
    shifting means connected to said divider means for providing a plurality of parallel outputs by shifting said second clock at the frequency of said first clock;
    conversion means connected to said shifting means and responsive to said plurality of parallel outputs for providing a pulsewidth-modulated signal at a predetermined frequency, said predetermined frequency being greater than said desired frequency; and
    integration means connected to said conversion means for providing said analog waveform at said desired frequency by integrating said pulsewidth-modulated signal.

2. The apparatus of claim 1 wherein said divider means comprises a multistage binary counter.

3. The apparatus of claim 1 wherein said shifting means comprises a multistage binary shift register.

4. The apparatus of claim 1 wherein said conversion means comprises:
    a second clock of one-half of said predetermined frequency;
    delay means responsive to said plurality of parallel outputs for providing a selectably delayed version of said second clock; and
    gating means connected to said second clock and to said selectably delayed version of said second clock for providing said pulsewidth-modulated signal, said pulsewidth-modulated signal being the modulo-2 sum of said second clock and said selectably delayed version of said second clock.

5. The apparatus of claim 4 wherein said delay means comprises:

a plurality of discrete delay means for providing a plurality of discrete delayed versions of said second clock, each said discrete delay means having a different delay from the other said discrete delay means; and multiplexing means connected to said plurality of discrete delay means and responsive to said plurality of parallel outputs for providing said selectably delayed version of said second clock by selecting one of said plurality of discrete delayed versions of said second clock.

6. The apparatus of claim 1 wherein said conversion means comprises:
a plurality of second clocks of a predetermined frequency, each second clock of said plurality of second clocks having a different pulsewidth than the other second clocks in said plurality of second clocks; and
multiplexing means connected to said plurality of second clocks and responsive to said plurality of parallel outputs for providing said pulsewidth-modulated signal by selecting one of said plurality of second clocks.

7. The apparatus of claim 1 wherein said integration means comprises a band pass filter having an upper cutoff frequency lower than said predetermined frequency.

8. The apparatus of claim 1 wherein said integration means comprises a low pass filter having a cutoff frequency lower than said predetermined frequency.

9. Apparatus responsive to a digital data signal for generating a differentially phase-encoded data signal, said differentially phase-encoded data signal having a desired carrier frequency, comprising:
a first clock having a frequency of N times said desired carrier frequency, N being an integer greater than one;
phase-changing divider means connected to said first clock for providing a second clock having said desired carrier frequency by dividing the frequency of said first clock by N, and responsive to said digital data signal for selectively changing the phase of said second clock;
shifting means connected to said divider means and shifted by said first clock for providing a plurality of parallel outputs;
conversion means connected to said shifting means and responsive to said plurality of parallel outputs for providing a pulsewidth-modulated signal having a predetermined frequency greater than said desired carrier frequency; and
integration means connected to said conversion means for providing said differentially phase-encoded data signal by integrating said pulsewidth-modulated signal.

10. The apparatus of claim 9 wherein said integration means comprises a band pass filter having an upper cutoff frequency between said desired carrier frequency and said predetermined frequency and a lower cutoff frequency below said desired carrier frequency.

11. The apparatus of claim 9 wherein said integration means comprises a low pass filter having a cutoff frequency between said desired carrier frequency and said predetermined frequency.

12. The apparatus of claim 9 wherein said phase-changing divider means comprises:
first inversion means connected to said first clock and responsive to said digital data signal for providing a first output by selectably inverting said first clock;
binary divider means connected to said first inversion means for providing a second output; and
second inversion means connected to said binary divider means and responsive to said digital data signal for providing said second clock by selectably inverting said second output.

13. The apparatus of claim 9 wherein said phase-changing divider means comprises:
a plurality of binary divider means responsive to said first clock and connected in tandem, the output of one of said binary divider means being connected to the input of the following one of said binary divider means;
interstage inversion means connected between a selected said binary divider means and the following said binary divider means and responsive to said digital signal for selectably inverting the input to said following said binary divider means; and
output inversion means connected to the last said binary divider means and responsive to said digital data signal for providing said second clock by selectably inverting the output of said last said binary divider means.

14. The apparatus of claim 13 and further comprising:
input inversion means connected between said first clock and the first said binary divider means and responsive to said digital data signal for selectably inverting the input to said first said binary divider means.

15. The apparatus of claim 13 wherein said binary divider means comprises a flip-flop.

16. The apparatus of claim 13 wherein said interstage inversion means comprises an exculsive-OR gate.

17. The apparatus of claim 11 wherein said output inversion means comprises an exclusive-OR gate.

18. The apparatus of claim 9 wherein said phase-changing divider means causes phase changes of 0°, 90°, 180°, and 270° in said second clock in response to said digital data signal comprising the dibit pairs 00, 10, 01, and 11, respectively.

19. Apparatus for changing the phase of a carrier signal in response to a digital data signal, comprising:
a clock having a frequency of two times the desired frequency of said carrier signal;
first inversion means connected to said clock and responsive to said digital data signal for providing a first output by selectably inverting said first clock;
binary divider means connected to said first inversion means for providing a second output; and
second inversion means connected to said binary divider means and responsive to said digital data signal for providing said carrier signal by selectably inverting said second output.

20. The apparatus of claim 19 wherein said binary divider means comprises a flip-flop.

21. The apparatus of claim 19 wherein said first inversion means comprises an exclusive-OR gate.

22. The apparatus of claim 20 wherein said second inversion means comprises an exclusive-OR gate.

23. Apparatus for changing the phase of a carrier signal in response to a digital data signal; comprising:
a clock having a frequency of N times the desired frequency of said carrier signal, N being an integer greater than one;

a plurality of binary divider means responsive to said clock and connected in tandem for dividing the frequency of said clock by N, the output of one of said binary divider means being connected to the input of the following one of said binary divider means;

interstage inversion means connected between a selected binary divider means and the following said binary divider means and responsive to said digital data signal for selectably inverting the input to said following said binary divider means; and output inversion means connected to the last said binary divider means and responsive to said digital data signal for providing said carrier signal by selectably inverting the output of said last said binary divider means.

24. The apparatus of claim 23 and further comprising: input inversion means connected between said clock and the first said binary divider means and responsive to said digital data signal for selectably inverting the input to said first said binary divider means.

25. The apparatus of claim 23 wherein said binary divider means conprises a flip-flop.

26. The apparatus of claim 23 wherein said interstage inversion means comprises an exclusive-OR gate.

27. The apparatus of claim 26 wherein said output inversion means comprises an exclusive-OR gate.

28. The apparatus of claim 23 wherein said digital data signal comprising the dibit pairs of 00, 01, 11, and 10 causes phase changes in said carrier signal of 0°, 90°, 180°, and 270°, respectively.

29. Apparatus responsive to a two bit digital data signal for generating a quadrature differentially phase-encoded data signal having a desired carrier frequency, comprising:

a first clock having a frequency of eight times said desired carrier frequency;

first divider means connected to said first clock for providing a second clock having a frequency of twice said desired carrier frequency;

first inversion means connected to said first divider means and responsive to one of said bits of said two-bit digital data signal for selectively inverting or not inverting said second clock;

second divider means connected to said first inversion means for providing a third clock having a frequency of said desired carrier frequency;

second inversion means connected to said second divider means and responsive to the other bit of said two-bit digital data signal for providing a first tap signal by selectably inverting or not inverting said third clock;

shifting means connected to said second inversion means and shifted by said first clock for providing a second tap signal and a third tap signal, said second tap signal and said third tap signal being delayed versions of said first tap signal;

conversion means responsive to said first tap signal, said second tap signal, and said third tap signal for providing a pulsewidth-modulated signal having a predetermined frequency greater than said desired carrier frequency; and integration means connected to said conversion means for providing said quadrature differentially phase-encoded data signal by integrating said pulsewidth-modulated signal.

30. The apparatus of claim 29 wherein said integration means comprises a low pass filter having a cutoff frequency between said desired carrier frequency and said predetermined frequency.

31. The apparatus of claim 29 wherein said integration means comprises a band pass filter having an upper cutoff frequency between said desired carrier frequency and said predetermined frequency and a lower cutoff frequency below said desired carrier frequency.

32. The apparatus of claim 29 wherein said conversion means comprises:

a fourth clock having a frequency of one-half of said predetermined frequency;

delay means responsive to said first tap signal, said second tap signal, and said third tap signal for providing a selectably delayed version of said fourth clock; and gating means connected to said fourth clock and said delay means for providing said pulsewidth-modulated signal, said pulsewidth-modulated signal being the modulo-2 sum of said fourth clock and said selectably delayed version of said fourth clock.

33. The apparatus of claim 32 wherein said delay means comprises:

a plurality of discrete delay means for providing at least four discrete delayed versions of said fourth clock, each said discrete delay means providing a different delay than the other said discrete delay means; and multiplexing means connected to said fourth clock and to said plurality of discrete delay means and responsive to said first tap signal, said second tap signal, and said third tap signal for providing said selectably delayed version of said fourth clock by selecting said fourth clock or one of said discrete delayed versions of said fourth clock.

34. The apparatus of claim 29 wherein said delay means comprises:

at least five clocks having said predetermined frequency, each clock of said five clocks having a different pulsewidth than the other clocks of said five clocks; and multiplexing means connected to said five clocks and responsive to said first tap signal, said second tap signal, and said third tap signal for providing said pulsewidth-modulated signal by selecting one of said five clocks.

35. The apparatus of claim 34 wherein said five clocks have pulsewidths corresponding to approximate duty cycles of 0%, 29.7%, 50%, 70.3%, and 100%.

36. The apparatus of claim 29 wherein said two-bit digital data signals are dibit pairs of 00, 01, 11 and 10 and cause phase changes in said quadrature differentially phase-encoded data signal of 0°, 90°, 180°, and 270°, respectfully.

37. Apparatus for converting a digital signal into an analog signal, comprising:

a clock of a predetermined frequency;

delay means responsive to said digital signal for providing a selectably delayed version of said clock;

gating means connected to said clock and said delay means for providing a pulsewidth-modulated signal, said pulsewidth-modulated signal being the modulo-2 sum of said clock and said selectably delayed version of said clock; and integration means connected to said gating means for providing said analog signal by integrating said pulsewidth-modulated signal.

38. The apparatus of claim 37 wherein said integration means comprises a band pass filter having an upper cutoff frequency lower than said predetermined frequency.

39. The apparatus of claim 37 wherein said integration means comprises a low pass filter having a cutoff frequency lower than said predetermined frequency.

40. The apparatus of claim 37 wherein said delay means comprises:
- a plurality of discrete delay means for providing a plurality of discrete delayed versions of said clock, each said discrete delay means providing a different delay than the other said discrete delay means; and
- multiplexing means connected to said plurality of discrete delay means and responsive to said digital signal for providing said selectably delayed version of said clock by selecting one of said plurality of discrete delayed versions of said clock.

41. Apparatus for summing a first digital signal and a second digital signal to provide an analog signal, comprising:
- a first clock of a predetermined frequency;
- first conversion means for converting said first digital signal into a first phase-delayed version of said first clock;
- second conversion means for converting said second digital signal into a second phase-delayed version of said first clock;
- gating means connected to said first conversion means and said second conversion means for providing a pulsewidth-modulated second clock, said second clock being the modulo-2 sum of said first phase-delayed version and said second phase-delayed version; and
- integration means connected to said gating means for providing said analog signal by integrating said pulsewidth-modulated second clock.

42. The apparatus of claim 41 wherein said integration means comprises a low pass filter filter having a cutoff frequency lower than twice said first predetermined frequency.

43. The apparatus of claim 41 wherein said integration means comprises a band pass filter having an upper cutoff frequency lower than twice said first predetermined frequency.

44. The apparatus of claim 41 wherein said first conversion means comprises:
- a first plurality of discrete delay means for providing a first plurality of discrete delayed version of said first clock, each said discrete delay means having a different delay from the other said discrete delay means; and
- first multiplexing means connected to said first plurality of discrete delay means and responsive to said first digital signal for providing said first phase-delayed version of said first clock by selecting one of said first plurality of discrete delayed versions of said first clock.

45. The apparatus of claim 44 wherein said second conversion means comprises:
- a second plurality of discrete delay means for providing a second plurality of discrete delayed versions of said first clock, each said discrete delay means having a different delay from the other said discrete delay means; and
- second multiplexing means connected to said second plurality of discrete delay means and responsive to said second digital signal for providing said second phase-delayed version of said first clock by selecting one of said second plurality of discrete delayed versions of said first clock.

46. The apparatus of claim 45 wherein the mean phase of said first plurality of discrete delayed versions of said first clock differs by ninety degrees from the mean phase of said second plurality of discrete delayed versions of said first clock.

47. The apparatus of claim 41 wherein the mean phase of said first phase-delayed version of said first clock differs by ninety degrees from the mean phase of said second phase-delayed version of said first clock.

* * * * *